(12) United States Patent
Senant

(10) Patent No.: US 12,455,725 B2
(45) Date of Patent: Oct. 28, 2025

(54) AUTONOMOUS VEHICLE CLOUD SERVICES TESTING

(71) Applicant: GM Cruise Holdings LLC, San Francisco, CA (US)

(72) Inventor: Eric Senant, Albany, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 116 days.

(21) Appl. No.: 18/480,044

(22) Filed: Oct. 3, 2023

(65) Prior Publication Data
US 2025/0110703 A1 Apr. 3, 2025

(51) Int. Cl.
*G06F 8/30* (2018.01)
*G06F 11/36* (2025.01)

(52) U.S. Cl.
CPC .................... *G06F 8/30* (2013.01)

(58) Field of Classification Search
CPC .................. G06F 8/30; G06F 11/36
See application file for complete search history.

(56) References Cited

U.S. PATENT DOCUMENTS 11,968,261 B2 * 4/2024 Puchalski ........... H04L 63/1425
2019/0050276 A1 * 2/2019 Kim ..................... G06F 9/541

* cited by examiner

*Primary Examiner* — Duy Khuong T Nguyen
(74) *Attorney, Agent, or Firm* — Honigman LLP; Matthew H. Szalach; Jonathan P. O'Brien

(57) ABSTRACT

Systems, methods, and apparatuses are provided for testing and measuring the behavior or logic of one or more cloud services associated with an updated AV bot script. For example, a system may be configured to receive a first autonomous vehicle (AV) bot script, reference data associated with a first cloud service, and configuration data identifying at least a first variable of a set of adjustable variables of a simulated AV, a first value of a set of values associated with the first variable, and the first cloud service. Additionally, the system may be configured to generate a second AV bot script based on the configuration data and the first AV bot script. Further, the system may be configured to receive cloud output data associated with the first cloud service and determine one or more differences between the cloud output data and the reference data.

20 Claims, 9 Drawing Sheets

AUTONOMOUS VEHICLE CLOUD SERVICES TESTING

BACKGROUND

1. Technical Field

The present disclosure generally relates to cloud services associated with autonomous vehicles (AVs) and, more specifically, testing and measuring the robustness of the cloud services of the AVs.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Additionally, data generated by the sensors may be transmitted to one or more cloud services. The cloud services may manage the autonomous vehicle and provide additional AV-related services to the autonomous vehicle (e.g., remote/roadside assistance services).

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
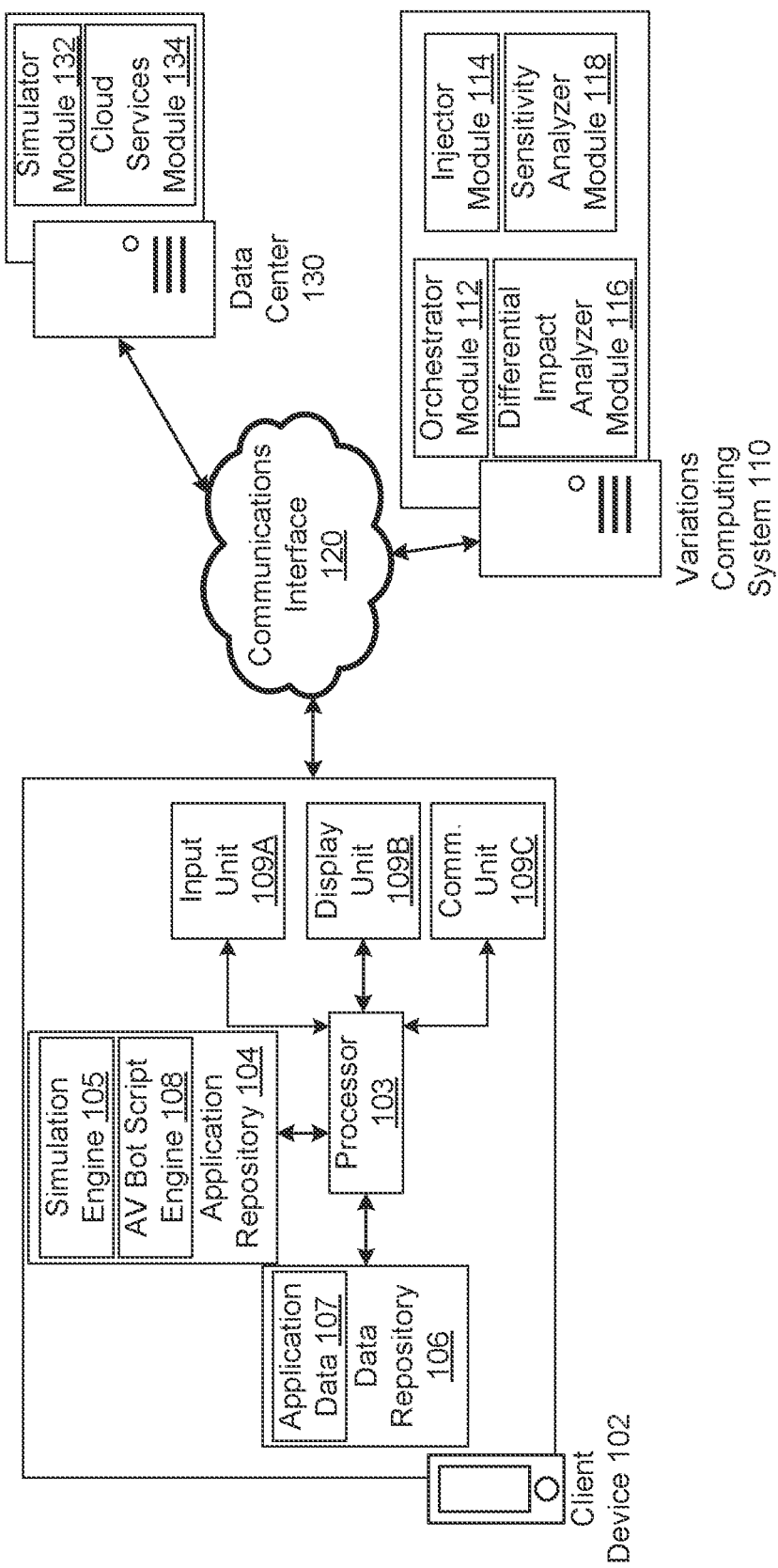
FIG. 1 is a diagram of an exemplary computing environment, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

In some examples, one or more autonomous vehicles (AVs) and one or more cloud services may communicate with one another. Additionally, the one or more cloud services may manage each of the AVs and provide additional AV-related services to the autonomous vehicle (e.g., a ride hailing service). Further, operators managing the one or more cloud services may utilize a reactive and iterative approach when identifying issues that arise with the one or more cloud services. Such approaches may ignore a huge number of potential issues that may arise in the future.

As described herein, a computing system may be configured to test and measure a wider range of behaviors of the one or more cloud services by sweeping a full or wider range of inputs, such as messages or AV messages generated by one or more AVs or simulated AVs, provided to the one or more cloud services. For example, the computing system may simulate one or more AVs communicating with the one or more cloud services. Additionally, the computing system may adjust one or more variables of the AV messages the simulated one or more AVs may transmit to the one or more cloud services. Moreover, the computing system may test and measure the behaviors of the one or more cloud services based on the adjusted one or more variables. In some instances, the computing system may utilize the tested and measured behaviors to verify the logic of the one or more cloud services.

For instance, the computing system may determine the tested and measured behaviors of the one or more cloud services is expected. In such an instance, the computing system may verify the logic of the one or more cloud services. Alternatively, and in another instance, the computing system may determine the tested and measured behaviors of the one or more cloud services are unexpected (e.g., the messages or signals generated from the one or more cloud services are unexpected). In such instances, the computing system may implement operations to determine one or more mitigations to reduce the occurrence of the unexpected behavior. The one or more mitigations may be associated with one or more adjustments to the one or more variables of the simulated one or more AVs. As such, the computing system may incorporate such feedback into its future simulations.

FIG. 1 is a diagram illustrating an exemplary computing environment 100, consistent with certain disclosed embodiments. As illustrated in FIG. 1, computing environment 100 may include one or more client devices, such as client device 102, and one or more computing systems, such as variations computing system 110 and data center computing system 130. The one or more client devices and the one or more computing systems may be interconnected through any appropriate combination of communications networks, such as communications network 120.

As described herein, variations computing system 110 may provide instructions to data center computing system 130 to adjust one or more variables of one or more AV messages generated by one or more AVs simulated by data center computing system 130. Additionally, data center computing system 130 may provide the one or more AV messages to one or more associated cloud services to obtain one or more cloud messages that a corresponding cloud service may generate and transmit to an associated simulated AV. Moreover, data center computing system 130 may provide the one or more cloud messages to variations computing system 110. Further, variations computing system 110 may test and measure the behaviors of the corresponding cloud services based on the one or more cloud messages.

Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within computing environment 100 may perform operations that establish and maintain one or more secure channels of communication across communications network 120, such as, but not limited to, a transport layer security (TSL) channel, a secure socket layer (SSL) channel, or any other suitable secure communication channel.

In some examples, client device 102 may be operated by a corresponding user, such as an operator of datacenter computing system 130. Additionally, client device 102 may include a computing device having one or more tangible, non-transitory memories that store data and/or software instructions, and one or more processors, such as processor 103, configured to execute the software instructions. The one or more tangible, non-transitory memories may, in some aspects, store software applications, application modules, and other elements of code executable by the one or more processors, such as within application repository 104.

For example, as illustrated in FIG. 1, client device 102 may maintain, within application repository 104, simulation engine 105. Simulation engine 105, when executed by processor 103, may perform any of the exemplary processes described herein to configure an autonomous vehicle (AV) to be simulated by datacenter computing system 130. As described herein, the simulated AV may be representative of and be based on one or more AVs managed by datacenter computing system 130. Additionally, the executed simulation engine 105 may obtain one or more user inputs that identify one more variables or characteristics of a simulated AV. In some examples, the one or more user inputs may indicate adjustments or variations to the one or more variables of the simulated AV. In such examples, the simulated AV may generate and provide one or more or a set of AV messages that may be provided to one or more cloud services based on the adjustments or variations indicated by the one or more user inputs. Additionally, the AV messages of the simulated AV may be utilized to test and measure the behavior of the one or more cloud services.

In some examples, executed simulation engine 105 may generate configuration data based on the one or more user inputs. In some instances, the configuration data may be in yet-another-markup-language (YAML) format. In other instances, the configuration data may be in a JavaScript Object Notation (JSON) format. As described herein, the configuration data may identify a state of a variable to adjust in an AV message that a simulated AV may generate and provide to one or more cloud services. Additionally, the configuration data may indicate when to adjust the state of the variable or a condition that triggers the adjustment.

In some instances, the variable may be associated with a component of the simulated AV. For instance, the variable may be associated with a sensor, such as a seat occupancy sensor, a window sensor, an emergency stop trigger/button, a seat belt sensor, a tire sensor, and/or a door sensor. In such instances, the configuration data may identify the component (e.g., an occupancy sensor). Additionally, the configuration data may indicate a particular state of the corresponding component to, in a corresponding AV message (e.g., a state of the occupancy sensor to include in one or more of the AV messages). In some instances, configuration data may include a value corresponding to a particular state of a component. In such instances, the component may have a range of states or multiple states and each state of the range or multiple states may have a corresponding value. As such, the value may be one of multiple, or a range or set of values. Moreover, the configuration data may include a timing parameter associated with the state of the corresponding moments component. For instance, the timing parameter may indicate a particular time or time interval the simulated component is to be in that particular state. Additionally, data center computing system 130 may perform operations that cause the simulated AV to generate one or more AV messages that include information corresponding to the particular state of the component and generate and/or output the one or more AV messages in accordance with the timing parameter. The one or more AV messages may be transmitted or outputted by the simulated AV after or at the indicated time or after or within the indicated time interval. Further, and in various instances, the configuration data may include a scenario identifier that identifies a scenario to apply the configuration data to.

In other instances, the variable may be associated with one or more modes of a simulated AV (e.g., manual mode, recovery mode, driverless mode, etc.). Additionally, the configuration data may identify one or more modes. For instance, configuration data may include a value corresponding to each of the one or more modes of the simulated AV. Moreover, the parameter may include a timing parameter associated with each of the one or more modes. For instance, the timing parameter may indicate the simulated AV is to be in a particular mode (e.g., driverless mode) at a particular time or time interval. In such an instance, data center computing system 130 may perform operations that cause the simulated AV to generate one or more AV messages in accordance with the timing parameter. Additionally, the one or more AV messages may indicate the simulated AV is in the indicated mode. The one or more signals may be transmitted or outputted by the simulated AV at the indicated time or within the indicated time interval.

Referring back to FIG. 1, client device 102 may include input unit 109A configured to receive the input from the user. In some examples, input unit 109B may include, but input not limited to, a keypad, keyboard, touchscreen, voice activated control technologies, or appropriate type of input unit. Moreover, client device 102 may include display unit 109B configured to present interface elements to the user, such as interface elements that present, to the user, one or more variables that are configurable for a simulated AV. In some examples, display unit 109B may include, but is not limited to, an LCD display unit or other appropriate type of display unit. Further, in additional aspects (not depicted in FIG. 1), the functionalities of display unit 109A and input unit 109B may be combined into a single device, e.g., a pressure-sensitive touchscreen display unit that presents interface elements and receives input from the user.

By way of example, display unit 109B may present a graphical user interface (GUI) that presents to a user operating client device 102 information associated with each of the one or more variables of a simulated AV. Additionally, the user may provide, to input unit 109A, one or more inputs indicating the adjustments or configurations to the one or more variables. In some instances, the one or more inputs may indicate a particular variable of one or more AV messages to configure or adjust, the particular state of the indicated variable (e.g., a corresponding value), and, in some instances, a corresponding time parameter (e.g., a corresponding value). Moreover, executed simulation engine 105 may obtain the one or more inputs from input unit 109A and generate configuration data based on one or more portions of the input. Further, datacenter computing system 130, may simulate an AV in accordance with one or more portions of the configuration data.

In some examples, client device 102 may generate an autonomous vehicle (AV) bot script. In such examples, client device 102 may maintain, within application repository 104, AV bot script engine 108. AV bot script engine 108, when executed by processor 103, may perform any of the exemplary processes described herein to generate the AV bot script. As described herein, an AV bot script may include a sequence of instructions for a particular AV simulation. In some instances, the AV bot script may include data that identifies one or more cloud services that the simulated AV may be communicating with. Additionally, the sequence of instructions may identify and characterize one or more inputs provided to the simulated AV and one or more AV messages the simulated is to generate and output to the identified one or more cloud services based on the one or more inputs. As such, when the AV bot script (or updated AV bot script) is executed, the simulated AV may generate and output the one or more AV messages in accordance with the AV bot script. As described herein, the one or more AV messages may be utilized to test and measure the behavior of the one or more identified cloud services.

Further, the executed AV bot script may be associated with reference data of the one or more identified cloud services. In some instances, the reference data may include data of identifying and characterizing one or more or a set of cloud messages generated by the one or more identified cloud services. The one or set of cloud messages may be generated for the simulated AV. Further, the one or more identified cloud services may generate the one or the set of cloud messages based on the AV messages of the simulated AV of the corresponding AV bot script.

In some instances, the one or more AV messages of an AV bot script may correspond to one or more phases or events associated with one or more AVs managed by data center computing system 130 or simulated AVs. Examples of such events include, but are not limited to, a pick-up event (e.g., AV travels to a pick up location to pick up a rider), en-route event (e.g., after AV picks up rider, AV travels to a destination location with a rider), drop off event (e.g., AV arrives at destination location and rider exits vehicle), emergency event (e.g., AV performs operations associated with in incoming emergency vehicle, with or without a rider, AV awaiting instruction from datacenter 130 to implement one or more emergency procedures, etc.), maintenance event (e.g., AV travels to a maintenance location for service/maintenance), delivery event.

In other instances, the AV bot script (or updated AV bot script) includes environmental data characterizing an environment the simulated AV may be in. The environmental data may include one or more environment parameters, such as, but are not limited to, weather related parameters (e.g., air temperature, atmospheric pressure, humidity, precipitation, solar radiation and wind), road surface parameters (e.g., how well paved the road is), road network parameters, pedestrian parameters (e.g., amount, location and direction/heading), and other vehicle parameters (e.g., amount, location and direction/heading). In such instances, the one or more AV messages may be generated in accordance with the environmental data of the AV bot script.

In various instances, the sequence of instructions may identify and characterize one or more timing parameters and each of the one or more timing parameters may be associated with one or more AV messages of the simulated AV. Each of the timing parameters may correspond to a particular time or time interval the simulated AV may generate and/or output the one or more AV messages. For instance, a timing parameter may be associated with an occupancy sensor. Additionally, the timing parameter may indicate that the occupancy sensor detects a rider within the simulated AV at a particular time(s) or time interval(s). As such, the AV messages generated by the simulated AV may include occupancy sensor state data indicating the detected rider within the simulated AV at the particular time(s) or time interval(s).

Referring back to FIG. 1, client device 102 may also establish and maintain, within one or more tangible, non-tangible memories, one or more structured or unstructured data repositories or databases, such as data repository 106 that includes application data 107. In some instances, application data 107 may include information that facilitates a performance of operations by the one or more executed application programs maintained within application repository 104, such as simulation engine 105. Further, client device 102 may also include a communications unit 109C, such as a wireless transceiver device, coupled to processor 103 and configured by processor 103 to establish and maintain communications with communications network 120 using any of the communications protocols described herein.

In some instances, variations computing system 110 may perform any of the exemplary processes that client device 102 may perform. For instance, variations computing system 110 may perform any of the exemplary processes that client device 102 may perform to configure an AV to be simulated by data center computing system 130 (e.g., generating configuration data based on one or more user inputs, generating one or more AV bot scripts, etc.).

As illustrated in FIG. 1, variations computing system 110 may utilize one or more portions of configuration data generated by client device 102 to update or process an AV bot script. Additionally, variations computing system 110 may test and measure the behavior of one or more cloud services associated with the AV bot script based on one or more AV messages of the corresponding simulated AV. As described herein, variations computing system 110 may correspond to a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, variations computing system 110 may correspond to a distributed system that includes computing components distributed across one or more networks, such as communications network 120, or other networks, such as those provided or maintained by cloud-service providers.

For example, at least one processor of variations computing system 110 may execute orchestrator module 112 and injector module 114 to update or process an AV bot script. Additionally, executed orchestrator module 112 may perform any of the exemplary processes described herein to generate or obtain configuration data. In some instances, executed orchestrator module 112 may execute a bot, such as an AV bot to perform any of the exemplary processes described herein to generate or obtain configuration data. In some instances, executed orchestrator module 112 may obtain configuration data generated by client device 102 over communications network 120 and route the configuration data to executed injector module 114. In other instances, based on one or more user inputs obtained from client device 102, executed orchestrator module 112 may generate the configuration data as described herein. In such instances, executed orchestrator module 112 may route the configuration data to executed injector module 114. Moreover, executed injector module 114 may obtain an AV bot script and generate an updated AV bot script based on one or more portions of configuration data.

As described herein, the updated AV bot script may include portions of the configuration data indicating a particular state of one or more variables identified in the configuration data. For instance, executed injector module 114 may identify, for each AV message identified in the AV bot script, one or more variables (e.g., a component or mode). Additionally, executed injector module 114 may identify each variable in the configuration data. Moreover, based on the one or more identified variables of the AV bot script and the one or more identified variables of the configuration data, executed injector module 114 may determine, for each identified variable of the AV bot script, a matching variable identified in the configuration data. Further, for each variable of the AV bot script that has a matching variable of the configuration data, executed injector module 114 may inject or replace the indicated state of the variable of the AV bot script with the state of the matching variable of the configuration data (e.g., replace the value of the input with the value of the state of the matching parameter of variable of the configuration data). The updated AV bot script may retain portions of the original AV bot script, such as data identifying one or more cloud services a simulated AV may be communicating with, and include one or more portions of the configuration data. Alternatively, and in some instances, executed injector module 114 may generate a second AV bot script. The second AV bot script may include portions of the original AV bot script and portions of configuration data. The portions of the configuration data included in the second AV bot script are portions that are associated with variables that match variables identified in the AV bot script (e.g., a state of each of the variables of the configuration data).

In some instances, the AV bot script may include timing parameters associated with the identified inputs of the AV bot script. In such instances, executed injector module 114 may also replace the one or more timing parameters of the AV bot script with the timing parameters of the configuration data. For instance, following the example above, the AV bot script may include a timing parameter associated with each of the one or more AV messages. Additionally, for each variable identified in the AV bot script that has a matching variable identified in the configuration data, executed injector module 114 may replace the timing parameter of the variable identified in the AV bot script with the timing parameter of the matching variable of the configuration data.

Referring back to FIG. 1, variations computing system 110 may obtain cloud output data of one or more cloud services associated with an updated AV bot script. As described herein, cloud output data may include data characterizing one or more signals, messages or information that a corresponding cloud service may transmit to an AV or simulated AV communicating with the corresponding cloud service. In some instances, multiple cloud services may be in communication with one another. In such instances, a particular cloud service may be dependent on one or more additional cloud services. Further, the cloud output data of the particular cloud service may include data characterizing data exchanges between the one or more additional cloud services and the particular cloud service. Additionally, variations computing system 110 may test and measure the behavior of the corresponding cloud service. In some instances, variations computing system 110 may test and measure the behavior of the corresponding cloud service by verifying the logic of one or more cloud services associated with the updated AV bot script based in part on the obtained cloud output data. Further, variations computing system 110 may verify the logic of the one or more cloud services by determining whether the one or more cloud services is behaving as expected. For instance, variations computing system 110 may compare the cloud output data associated with the updated AV bot script with the reference data of the AV bot script that the updated AV bot script is derived or updated from. Based on the comparison of the cloud output data and the reference data, variations computing system 110 may determine whether any differences exist between the cloud output data of the updated AV bot script and the reference data. In instances where no differences exist or the cloud output data of the updated AV bot script and the reference data match, variations computing system 110 may verify the logic of the one or more cloud services of the compared cloud output data by determining the one or more cloud services are behaving as expected. Additionally, variations computing system 110 may generate differential data indicating that the one or more cloud services have been verified and the one or more cloud services are behaving as expected. However, in instances where variations computing system 110 determines one or more differences exist between the cloud output data of the updated AV bot script and the reference data, variations computing system 110 may determine the one or more cloud services are not behaving as expected. Additionally, variations computing system 110 may generate differential data that indicate the one or more cloud services are not behaving as expected. Further, variations computing system 110 may determine the one or more differences and generate differential data that further includes data characterizing the determined one or more differences.

By way of example, at least one processor of variations computing system 110 may execute differential impact analyzer module 116. Executed differential impact analyzer module 116 may obtain, from data center computing system 130, cloud output data associated with an updated AV bot script data center computing system 130 executed. Additionally, executed differential impact analyzer module 116 may obtain, from data center computing system 130, reference data associated with an AV bot script associated with the updated AV bot script. As described herein, the associated AV bot script may be the AV bot script that the updated AV bot script was derived or updated from. Moreover, executed differential impact analyzer module 116 may compare the reference data with the cloud output data and determine whether any differences exist between the reference data and the cloud output data. Executed differential impact analyzer module 116 may generate differential data identifying and indicating whether any differences exist between the reference data and the cloud output data. In examples where executed differential impact analyzer module 116 determines there are one or more differences between the cloud output data and the reference data, executed differential impact analyzer module 116 may generate differential data that includes data indicating that one or more differences exist between the cloud output data and the reference data and data characterizing the determined differences. However, in examples where executed differential impact analyzer module 116 determines that the cloud output data and reference data match, where executed differential impact analyzer module 116 may generate differential data indicating that the logic of the corresponding cloud service(s) is verified and that the cloud output data and the reference data match.

In some examples, variations computing system 110, may generate multiple updated AV bot scripts based on a particular AV bot script. In such examples, based on configuration data generated by client device 102, executed injector module 114 may vary one aspect of a variable associated with the AV bot script. As described herein, each of the multiple updated AV bot scripts may include a sequence of instructions that identifies and characterizes one or more AV messages that each include information corresponding to the same variable. Additionally, in examples where the input of the variable may have one or more or a range of states (e.g., a variable corresponding to a window sensor that includes a range of states associated with the gap of the window), the one or more AV message of each of the multiple updated AV bot scripts may each include information of the same variable with a differing state or corresponding value of the different state. Further, As described herein, each of the multiple updated AV bot scripts may each be associated with a corresponding cloud output data. Further each cloud output data of each of the multiple updated AV bot scripts may be based on the corresponding one or more AV messages generated by the corresponding updated AV bots script.

Further, variations computing system 110, may verify the logic of a particular cloud service of each of the multiple updated AV bot scripts based in part on the obtained cloud output data of each of the multiple the updated AV bot scripts. For instance, for each of the multiple updated AV bot scripts, executed differential impact analyzer module 116 may compare an associated cloud output data with the reference data associated with the AV bot script that the multiple updated AV bot scripts were derived or updated from. Based on the comparison of the cloud output data and the reference data, executed differential impact analyzer module 116 may, for each of the multiple updated AV bot scripts, determine whether any differences exist between the corresponding cloud output data and the reference data. Additionally, executed differential impact analyzer module 116 may generate differential data based on the comparison.

In instances where no differences exist or the cloud output data of the updated AV bot script and the reference data match, executed differential impact analyzer module 116 may generate differential data indicating that the one or more cloud services have been verified and the one or more cloud services are behaving as expected. However, in instances where one or more differences exist between the cloud output data and the reference data, executed differential impact analyzer module 116 may generate differential data indicating the corresponding cloud service is not behaving as expected. Additionally, in such instances, the differential data may characterize the one or more differences. Moreover, executed sensitively analyzer module 118 may generate aggregate differential data based on the differential data of each of the multiple updated AV bot scripts. As described herein, the aggregate differential data may include information of a behavior of a particular cloud service with the varying states of a particular input of a particular variable of each of the multiple updated AV bot scripts. In instances where the information indicates an unexpected behavior, the aggregate differential data may include information characterizing the unexpected behavior globally.

Further, executed sensitively analyzer module 118 may generate aggregate differential data by aggregating the differential data of each of the multiple updated AV bot scripts. As described herein, the aggregate differential data may include information of a behavior of a particular cloud service with the varying states of a particular variable of one or more AV messages generated by each of the multiple updated AV bot scripts. For instance, the aggregate differential data may identify a particular AV bot script and associated updated AV bot scripts. Additionally, the aggregate differential data may identify for one or more variable associated with the AV bot script and each of the associated updated AV bot scripts. Moreover, the aggregate differential data may identify and characterize one or more signals, messages or information of a corresponding cloud service, or in some instances, between one or more cloud services associated with each of the updated AV bot scripts. Further, the aggregate differential data may identify and characterize one or more signals, messages or information of a corresponding cloud service, or in some instances, between one or more cloud services associated with each of the particular AV bot script. In instances where the information indicates an unexpected behavior, such as the cloud output data of one updated AV bot script is different from the reference data, the aggregate differential data may include information characterizing the unexpected behavior. Additionally, executed sensitively analyzer module 118 may implement operations that cause a mobile computing device, such as client device 102, to present information included in the aggregate differential data (e.g., whether the variations of the state of one or inputs of one or more variables of the simulated AV causes an associated cloud service is behaving as expected, unexpectedly, and if unexpectedly what the behavior is).

In some examples, variations computing system 110 may obtain mitigation data associated with differential data of an updated AV bot script or aggregate differential data of multiple AV bot scripts. Additionally, variations computing system 110 may incorporate one or more portions of the mitigation data in subsequent updated AV bot scripts. In some instances, variations computing system 110 may obtain mitigation data from a computing system associated with data center computing system 130 or data center computing system 130. As described herein, mitigation data may include data one or more mitigation parameters and characterizing a state of each of the one or more mitigation parameters. Each of the one or more mitigation parameters and corresponding states may reduce the occurrence of the unexpected behaviors indicated and characterized in the differential data or aggregate differential data. Further, the one or more mitigation parameters may be associated with a variable identified in any of the updated AV bot scripts of the differential data or aggregate differential data.

In some instances, the one or more mitigation parameters and corresponding states may be associated with a component that may be added to one or more AVs managed by data center computing system 130 (e.g., a low pass filter for an occupancy sensor). In such instances, the one or more mitigation parameters and corresponding states may identify and characterize one or more inputs of the component and one or more corresponding outputs. In some instances, variations computing system 110 may obtain the mitigation data from a computing system associated with data center computing system 130.

In other instances, the one or more mitigation parameters and corresponding states may be associated with changes to one or more parameters of one or more cloud services associated with the corresponding differential data or aggregate differential data. In such instances, the corresponding differential data or aggregate differential data may indicate flaws or faults of the one or more identified cloud services. Additionally, a computing system associated with data center computing system 130, such as a cloud services mitigation computing system, may implement updates to the one or more identified cloud services to reduce the occurrence of the unexpected behaviors indicated and characterized in the differential data or aggregate differential data. Further, client device 102 and/or variations computing system 110, may perform any of the exemplary processes described herein to test and measure the behavior of the one or more identified cloud services. That way, a determination can be made on whether the updates implemented by the computing system associated with data center computing system 130 reduced the occurrence of the unexpected behaviors indicated and characterized in the differential data or aggregate differential data.

In various instances, client device 102 may perform any of the exemplary processes described herein that variations computing system 110 performs to update or process an AV bot script to an updated AV bot script. In such instances, client device 102 may update or process the AV bot script based on one or more portions of configuration data generated by client device 102. Additionally, client device 102 may perform any of the exemplary processes described herein that variations computing system 110 performs to test and measure the behavior of one or more cloud services associated with the AV bot script based on one or more AV messages of the corresponding simulated AV.

Referring back to FIG. 1, data center computing system 130 may execute an AV bot script or an updated AV bot script to generate a simulation for an AV or simulate an AV. Additionally, data center computing system 130 may correspond to a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, data center computing system 130 may correspond to a distributed system that includes computing components distributed across one or more networks, such as communications network 120, or other networks, such as those provided or maintained by cloud-service providers.

For example, at least one processor of data center computing system 130 may execute simulator module 132 and cloud services module 134. Executed orchestrator module 112 may obtain an AV bot script, such as an updated AV bot script, from variations computing system 110 over one or more networks, such as communications network 120. Additionally, executed orchestrator module 112 may execute the updated AV bot script and obtain one or more AV messages of a corresponding simulated AV in accordance with the updated AV bot script.

Moreover, data center computing system 130 may perform any of the exemplary processes described herein to generate cloud output data associated with an updated AV bot script. For example, executed orchestrator module 112 may provide as input to executed cloud services module 134 the one or more AV messages and one or more portions of the AV bot script that identify at least a corresponding cloud service. Based on the one or more portions of the AV bot script that identify one or more cloud services that may communicate with the simulated AV of the executed updated AV bot script, executed cloud services module 134 may identify a particular cloud service. Further, executed cloud services module 134 may implement operations that execute the identified cloud service (e.g., a cloud service associated with ride-hail service) and provide as input to the identified cloud service, the one or more AV messages. The identified cloud service may generate cloud output data in accordance with the one or more AV messages and data center computing system 130 may provide the cloud output data to variations computing system 110. As described herein, variations computing system 110 may verify the logic of the identified cloud service based in part on the cloud output data.

Figure 2:
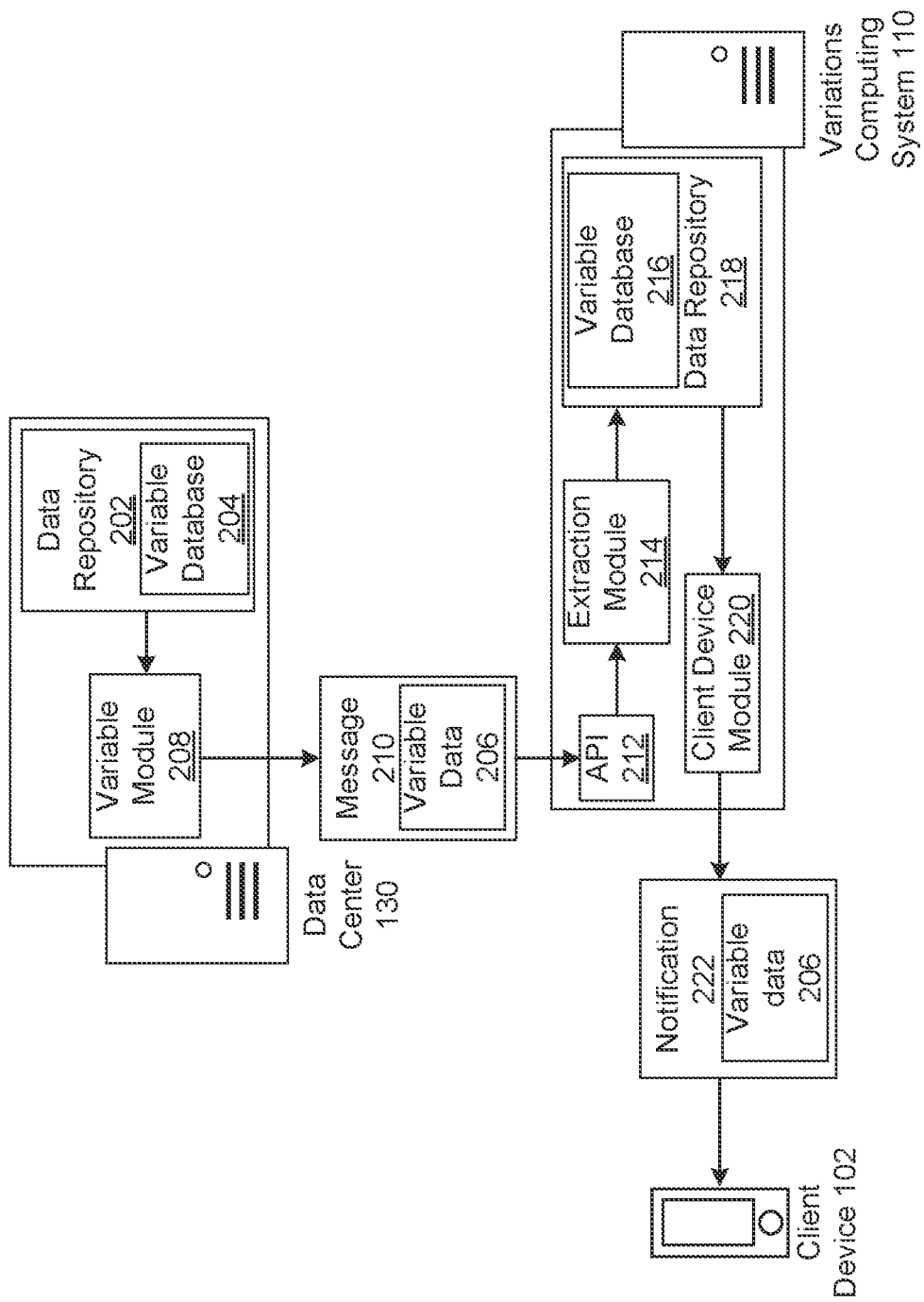
FIGS. 2-6 are diagrams of portions of the exemplary computing environment, according to some examples of the present disclosure.

FIGS. 2-6 illustrate portions of computing environment 100, in accordance with some exemplary embodiments. Referring to FIG. 2, client device 102 may display a graphical user interface (GUI) that presents to a user operating client device 102, information of the one or more variables of a simulated AV. As described herein, a state of each of the one or more variables the GUI may present information of may be adjusted or configured by the user. Additionally, data center computing system 130 may maintain elements of variable data that client device 102 may utilize to display the GUI that presents information of the one or more variables of a simulated AV.

For example, data center computing system 130 may maintain, within one or more tangible non-transitory memories, data repository 202 that includes variable database 204. As described herein, variable database 204 may include variable data 206 that identifies and characterizes variables of one or more AV messages that each of the autonomous vehicles (AVs) managed by data center computing system 130 may generate. Additionally, the variables may be associated with a component of the AVs (e.g., sensors, such as a seat occupancy sensor, a window sensor, an emergency stop trigger/button, a seat belt sensor, a tire sensor, etc.) or mode of the AVs (e.g., manual mode, recovery mode, driverless mode, etc.). Moreover, variable data 206 may include data identifying and characterizing all the possible states associated with each of the variables. In some instances, and for each variable identified in variable data 206, variable data 206 may include a set of values and each of the set of values corresponds to a different state associated with the parameter or variable. For instance, for a variable associated with an occupancy sensor, variable data 206 may include a set of values that includes a first value associated with an occupancy sensor detecting a person/object and a second value associated with an occupancy sensor not detecting a person/object. Further, variable data 206 may include timing parameter data for each of the variables. For each variable, the timing parameter data may identify a possible range of timing parameters, and each timing parameter of the range of timing parameters may indicate a particular time or time interval the corresponding variable is supposed to be in a particular state.

Additionally, one or more processors of data center computing system 130 may perform operations that transmit variable data 206 to client device 102. For example, when executed by the one or more processors of data center computing system 130, variable module 208 may perform any of the exemplary processes described herein to access variable database 204 and obtain one or more portions of variable data 206. Additionally, executed variable module 208 may generate a message 210 and include the one or more portions of variable data 206 within message 210. Moreover, executed variable module 208 may transmit, over one or more networks, such as communications network 120, message 210 to variations computing system 110. An application programming interface (API) 212 of variations computing system 110 may receive message 210 and route message 210 to extraction module 214, executed by one or more processors of variations computing system 110. Executed extraction module 214 may parse message 210 and obtain the one or more portions of variable data 206. Additionally, executed extraction module 214 may perform operations that store, within one or more tangible non-transitory memories of variation computing system 110, such as variable database 216 of data repository 218.

Moreover, one or more processors of variations computing system 110 may execute client device module 220 and executed client device module 220 may access variable database 216 to obtain the one or more portions of variable data 206. Further, executed client device module 220 may generate a message 222 and include the one or more portions of variable data 206 within message 222. Executed client device module 220 may transmit, over one or more networks, such as communications network 120, message 222 to client device 102.

Figure 3:
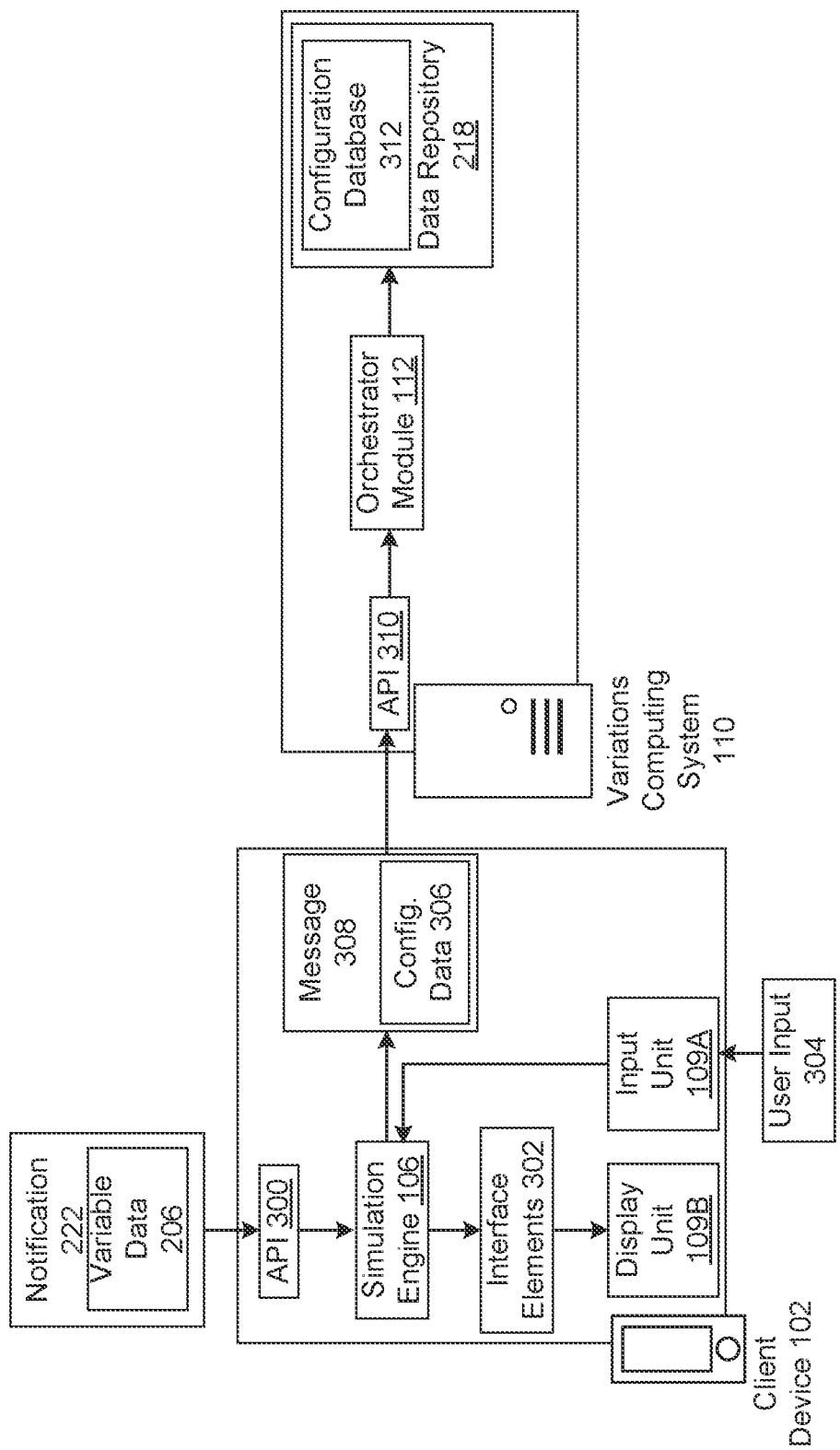

Based on the one or more portions of variable data 206 included in message 222, client device 102 may display a graphical user interface (GUI) that presents information identifying and characterizing the one or more variables. Referring to FIG. 3, an API 300 may receive message 222 from variations computing system 110 over one or more networks, such as communications network 120. Additionally, API 300 may route message 222 to simulation engine 105, that when executed by one or more processors of variation computing system 110, may parse message 222 to obtain the one or more portions of variable data 206. Further, based on the one or more portions of variable data 206, executed simulation engine 105 may generate interface elements 302 and provide interface elements 302 to display unit 109B. Display unit 109B may utilize interface elements 302 to render for presentation a GUI that presents information of the one or more variables included, identified and characterized in the one or more portions of variable data 206. Examples of information the GUI may present include information identifying and characterizing the one or more variables included in the one or more portions of variable data 206, and information identifying and characterizing, for each of the one or more variables, one or more states.

The user of client device 102 may provide one or more user inputs 304 into input unit 109A. As described herein, the one or more user inputs 304 may identify one or more variables displayed on display unit 109B. The identified variables may be the variables of AV messages of a simulated AV the user desires to customize, configure or adjust the state of. Additionally, the one or more user inputs 304 may identify a particular state for the identified one or more variables. For instance, the one or more user inputs 304 may indicate that the user of client device 102 has identified or selected a window sensor variable as the parameter or variable the user desires to adjust, customize or configure the state of. Moreover, based on the one or more user inputs 304, executed simulation engine 105 may generate configuration data 306. As described herein, configuration data 306 may include data identifying the one or more variables of one or more user inputs 304. Additionally, configuration data 306 may include data identifying and characterizing, for each of the one or more variables, a particular state. Further, executed simulation engine 105 may generate message 308 and include within one or more portions of message 308, one or more portions of configuration data 306. Executed simulation engine 105 may transmit message 308 to variations computing system 110, over one or more networks, such as communications network 120.

In some instances, configuration data 306 may include data identifying and characterizing, for each of the one or more variables, a timing parameter. In such instances, the one or more user inputs 304 may indicate a timing parameter and which of the one or more variables the timing parameter is associated with. As described herein, the timing parameter may cause the simulated AV to output one or more messages that include information of the associated variable, such as the state of the variable, at a particular time or time interval.

Referring back to FIG. 3, API 310 of variations computing system 110 may receive message 308 including one or more portions of configuration data 306. Additionally, API 310 may route message 308 to orchestrator module 112 executed by one or more processors of variations computing system 110. Moreover, executed orchestrator module 112 may perform any of the exemplary processes described herein to parse message 308 to obtain the one or more portions of configuration data 306. Further, executed orchestrator module 112 may store within one or more tangible non-transitory memories of variation computing system 110, such as configuration database 312 of data repository 218.

Figure 4:
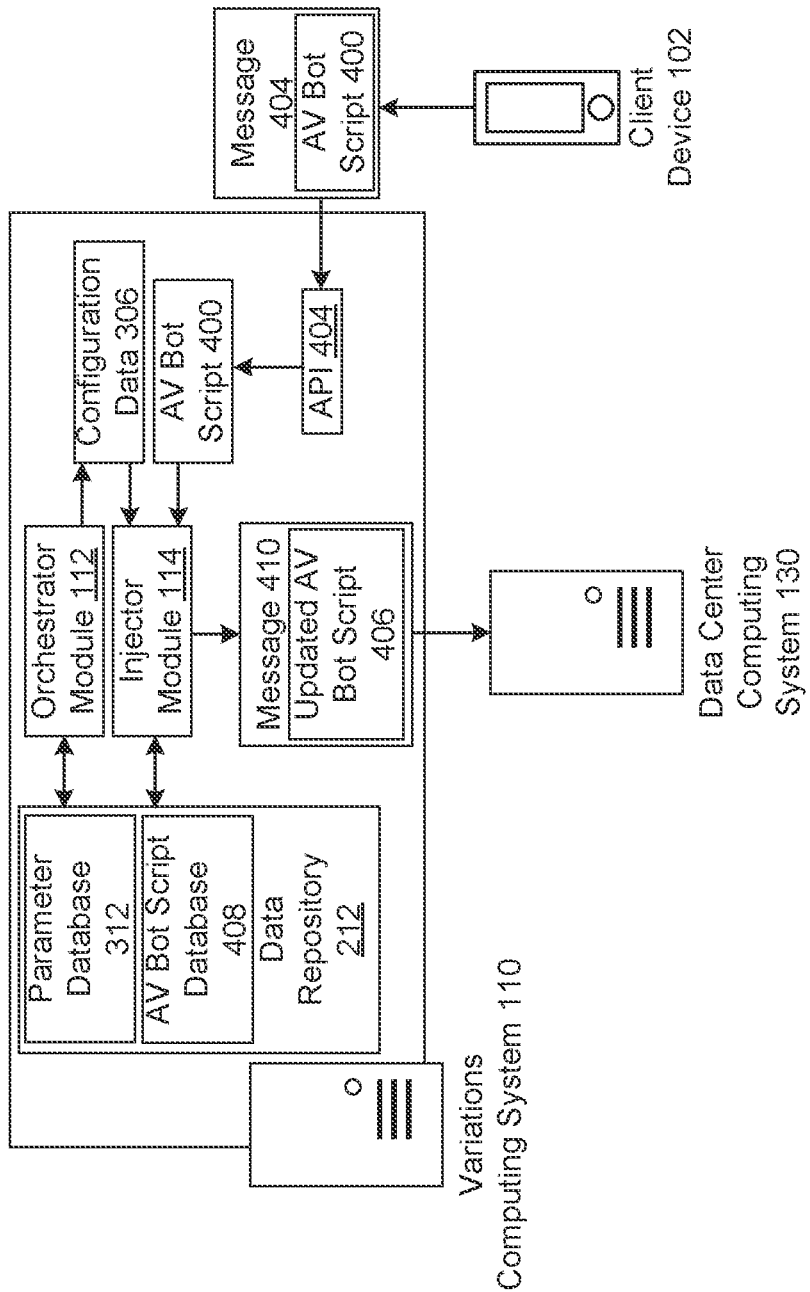

As described herein variations computing system 110 may test and measure the behavior or verify the logic of one or more cloud services based in part on one or more portions of configuration data 306. Referring to FIG. 4, executed orchestrator module 112 may obtain configuration data 306 and provide configuration data 306 as input to injector module 114 executed by one or more processors of variations computing system 110. Additionally, executed injector module 114 may obtain AV bot script, such as AV bot script 400. As illustrated in FIG. 4, executed injector module 114 may obtain, from client device 102, AV bot script 400. Moreover, client device 102 may generate AV bot script 400 and AV bot script 400 may include an identifier that indicates a scenario the AV bot script corresponds to. Further, based on the scenario identifier of configuration data 306, client device 102, such as simulation engine 105, may determine an AV bot script with an identifier that matches or corresponds to the scenario identifier of configuration data 306, such as AV bot script 400. As such, client device 102 may transmit configuration data 306 along with AV bot script 400, either in the same message, such as message 308 or in different messages.

In some examples, AV bot script 400 may be obtained from data center computing system 130 over one or more networks, such as communications network 120. In such instances, client device 102 may generate AV bot script 400 and transmit AV bot script 400, over one or more networks, such as communications network 120, to data center computing system 130. Additionally, data center computing system 130 may store, within one or more tangible non-transitory memories of data center computing system 130, such as data repository 202, AV bot script 400. In such examples, executed injector module 114 may transmit a request for a corresponding AV bot script, such as AV bot script 400. The request may include the scenario identifier of configuration data 306. Based on the scenario identifier of configuration data 306, data center computing system 130 may determine an AV bot script with an identifier that matches or corresponds to the scenario identifier of configuration data 306, such as AV bot script 400. Moreover, data center computing system 130 may transmit AV bot script 400 to executed injector module 114 over one or more communications networks, such as communications network 120.

As described herein, executed AV bot script engine 108 of client device 102 may perform any of the exemplary processes described herein to generate an AV bot script, such as AV bot script 400. Additionally, the AV bot script may be based on one or more user inputs of a user operating client device 102. Moreover, AV bot script may include a sequence of instructions for a particular AV simulation and the sequence of instructions may identify and characterize one or more AV messages that the simulated AV may generate in accordance with the AV bot script. Further, executed AV bot script engine 108 may generate a message, such as message 402, and include within one or more portions of the message, one or more portions of the AV bot script, such as AV bot script 400. Executed AV bot script engine 108 may transmit the message including the generated AV bot script to variations computing system 110. For instance, as illustrated in FIG. 4, API 404, executed by one or more processors of variations computing system 110, may receive message 402 including one or more portions of AV bot script 400 over one or more networks, such as communications network 120. Additionally, API 404 may route message 402 to executed injector module 114 and executed injector module 114 may parse and obtain the one or more portions of AV bot script 400.

As illustrated in FIG. 4, executed injector module 114 may generate updated AV bot script 406 based on AV bot script 400 and configuration data 306. As described herein, updated AV bot script 406 may include one or more portions of configuration data and one or more portions of AV bot script 400 (e.g., data identifying one or more cloud services that an AV simulated in accordance with AV bot script 400 may be communicating with). For example, based on AV bot script 400, executed injector module 114 may identify each input to an AV to be simulated in accordance with AV bot script. Additionally, based on the AV bot script, executed injector module 114 may determine, for each AV messaged identified in the AV bot script, an associated variable (e.g., a component or mode) and a corresponding state (e.g., for a component associated with an occupancy seat sensor the corresponding state may be that the occupancy seat sensor detects a person/object). Moreover, executed injector module 114 may determine or identify each variable (e.g., a component or mode) in configuration data 306 and a corresponding state (e.g., for a component associated with an occupancy seat sensor, the corresponding state may be that the occupancy seat sensor does not detect a person/object). Based on the identified variable of each of the one or more AV messages and the identified variables of configuration data 306, executed injector module 114 may determine, for each identified variable of AV bot script 400, a matching variable of configuration data 306. Further, for each matching variable, executed injector module 114 may update AV bot script 400 and generate updated AV bot script 406. In some instances, executed injector module 114 may perform operations that store, within one or more tangible non-transitory memories of variation computing system 110, such as AV bot script database 408 of data repository 218, AV bot script 400 and updated AV bot script 406.

For example, executed injector module 114 may replace, within AV bot script 400 the state of each matching variable with a corresponding state determined in the configuration data 306. By way of example, executed injector module 114 may determine that a first variable associated with a window sensor identified in configuration data 306 matches a second variable associated with a window sensor that is associated with a variable of one or more AV messages identified in AV bot script 400. Additionally, executed injector module 114 may determine that the first variable is associated with a state corresponding to a window gap of a first height, while the second variable is associated with a state corresponding to a window gap of a second height. Based on determining that the first variable matches the second variable, executed injector module 114 may update AV bot script 400 and generate updated AV bot script 406 by replacing, within AV bot script 400, the state of the second variable in the AV bot script (e.g., state corresponding to a window gap of a second height) with the state associated with the first variable (e.g., state corresponding to a window gap of a first height). As described herein, updated AV bot script 406 may include one or more portions of configuration data 306 and one or more portions of AV bot script 400 (e.g., data identifying one or more cloud services that an AV simulated in accordance with AV bot script 400 may be communicating with).

Referring back to FIG. 4, executed injector module 114 may transmit updated AV bot script 406 to data center computing system 130. For example, executed injector module 114 may generate message 410 and include, within one or more portions of message 410, one or more portions of updated AV bot script 406. Additionally executed injector module 114 may transmit message 410, including the one or more portions of updated AV bot script 406, to data center computing system 130, over one or more networks, such as communications network 120.

Figure 5:
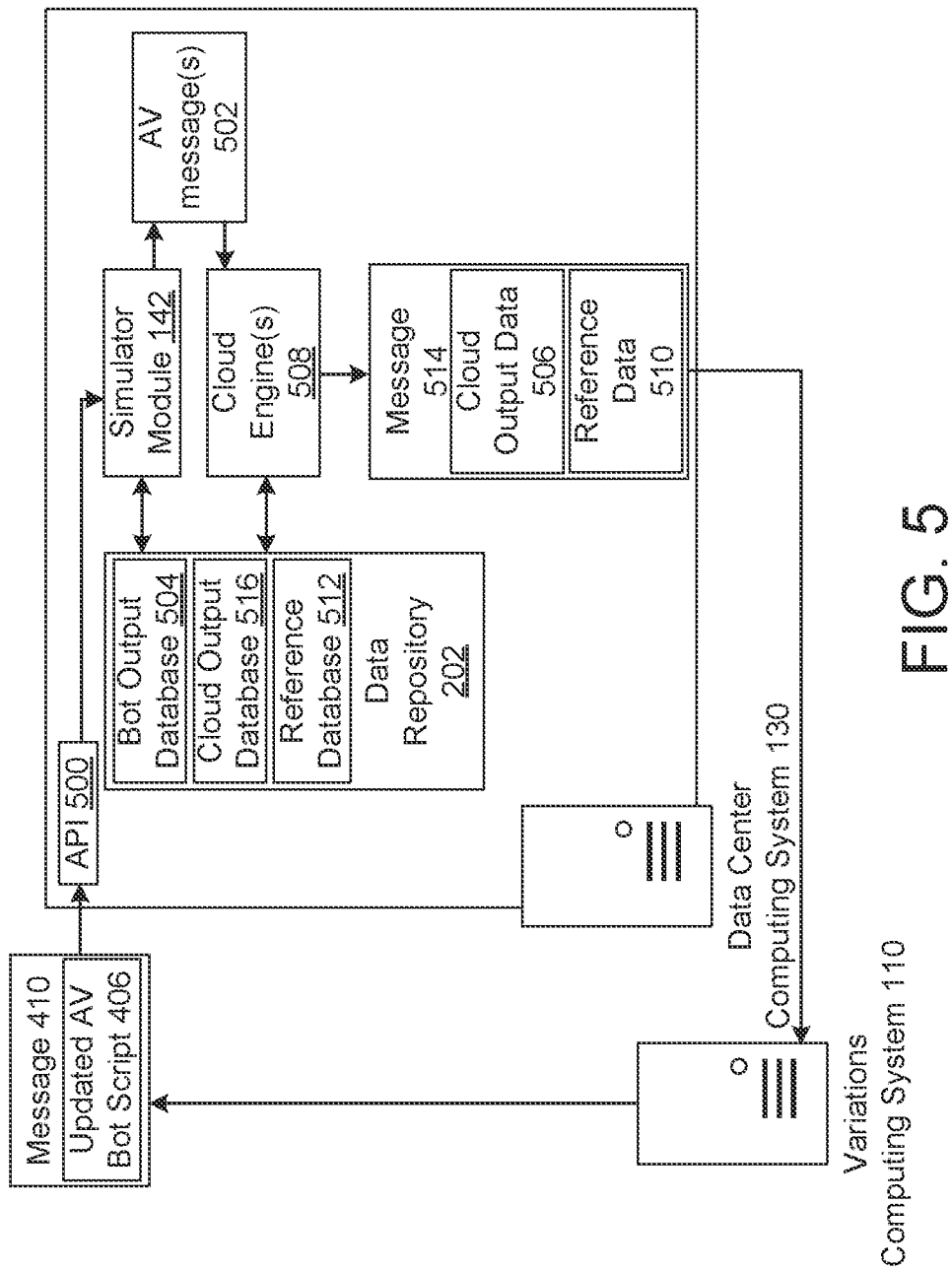

As described herein, data center computing system 130 may obtain updated AV bot script 406 and execute updated AV bot script 406. Referring to FIG. 5, API 500 executed by one or more processors of data center computing system 130 may obtain message 410 and route message 410 to executed simulator module 132. Executed simulator module 132 may parse message 410 and obtain updated AV bot script 406. Additionally, executed simulator module 132 may execute updated AV bot script 406 to obtain one or more AV messages 502.

For example, executed simulator module 132 may execute updated AV bot script 406 and generate a simulation of an AV or simulate an AV in accordance with the executed updated AV bot script 406. Additionally, the simulated AV may generate one or more AV messages 502 in accordance with the executed updated AV bot script 406. Moreover, the one or more AV messages 502 may include information of one or more variables, such as the state of an occupancy sensor variable, that one or more cloud services may utilize. In such examples, executed simulator module 132 may obtain the one or more AV messages 502 and provide the one or more AV messages 502 as input to executed cloud services module 134. Additionally, executed simulator module 132, may identify, from the associated updated AV bot script 406, one or more portions of updated AV bot script 406 that identify one or more cloud services that may communicate with the simulated AV of the executed updated AV bot script 406. Further, executed simulator module 132 may provide as input to executed cloud services module 134 the one or more portions of updated AV bot script 406 that identify one or more cloud services that may communicate with the simulated AV of the executed updated AV bot script 406, along with one or more AV messages 502. In some instances, executed simulator module 132 may perform operations that store, within one or more tangible non-transitory memories of data center computing system 130, such as bot output database 504 of data repository 202, the one or more AV messages 502.

Additionally, executed cloud services module 134 may perform any of the exemplary processes described herein to generate and obtain cloud output data 506 associated with one or more AV messages 502. For example, based on the one or more portions of updated AV bot script 406 that identify one or more cloud services that may communicate with the simulated AV of the executed updated AV bot script 406, executed cloud services module 134 may identify and execute a particular cloud service (e.g., a cloud service associated with ride-hail service), and provide as input to the identified and executed cloud service, the one or more AV messages 502. The identified and executed cloud service may generate cloud output data 506 based on the one or more AV messages 502. As described herein, cloud output data 506 may include data characterizing one or more signals, messages or information that a corresponding cloud service transmits to an AV or simulated AV communicating with the corresponding cloud service. Additionally, executed cloud services module 134 may obtain cloud output data 506 and provide cloud output data 506 to variations computing system 110. In some instances, executed simulator module 132 may perform operations that store, within one or more tangible non-transitory memories of data center computing system 130, such as cloud output database 516 of data repository 202, cloud output data 506.

Moreover, variations computing system 110 may verify the logic of an identified cloud service based in part on cloud output data 506 and reference data 510. As described herein, reference data 510 may include data characterizing one or more desired or expected signals, messages or information that a cloud service identified in an AV bot script, such as AV bot script 400, transmits to an AV or simulated AV communicating with the identified cloud service. Additionally, the AV bot script the reference data corresponds to, maybe the AV bot script that updated AV bot script was derived or updated from. Moreover, an AV bot script, such as AV bot script 400 may identify multiple cloud services that the associated simulated AV may communicate with. As such, reference data for each of the multiple cloud services may exist. As illustrated in FIG. 5, the reference data, such as reference data 510 may be stored within one or more tangible non-transitory memories of data center computing system 130, such as reference database 512 of data repository 202. Further, reference data of each of the cloud services identified in the AV bot script may be generated by executed cloud services module 134 implementing functional testing operations in accordance with the AV bot script.

In some examples, executed cloud services module 134 may access reference database 512 to obtain reference data 510. Reference data 510 may be associated with a cloud service (e.g., a cloud service associated with ride-hailing services) that cloud output data 506 is also associated with. In some instances, based on the cloud service associated with cloud output data, such as cloud output data 506, executed cloud services module 134 may access reference database 512 to determine reference data that is associated with the same cloud service, such as reference data 510. Additionally, executed cloud services module 134 may transmit reference data 510 along with cloud output data 506 to variations computing system 110. For example, executed cloud services module 134 may generate message 514 and include in one or more portions of message 514, one or more portions of reference data 510 and one or more portions of cloud output data 506. Additionally, executed cloud services module 134 may transmit message 514 including one or more portions of reference data 510 and one or more portions of cloud output data 506 to variations computing system 110, over one or more networks, such as communications network 120.

Figure 6:
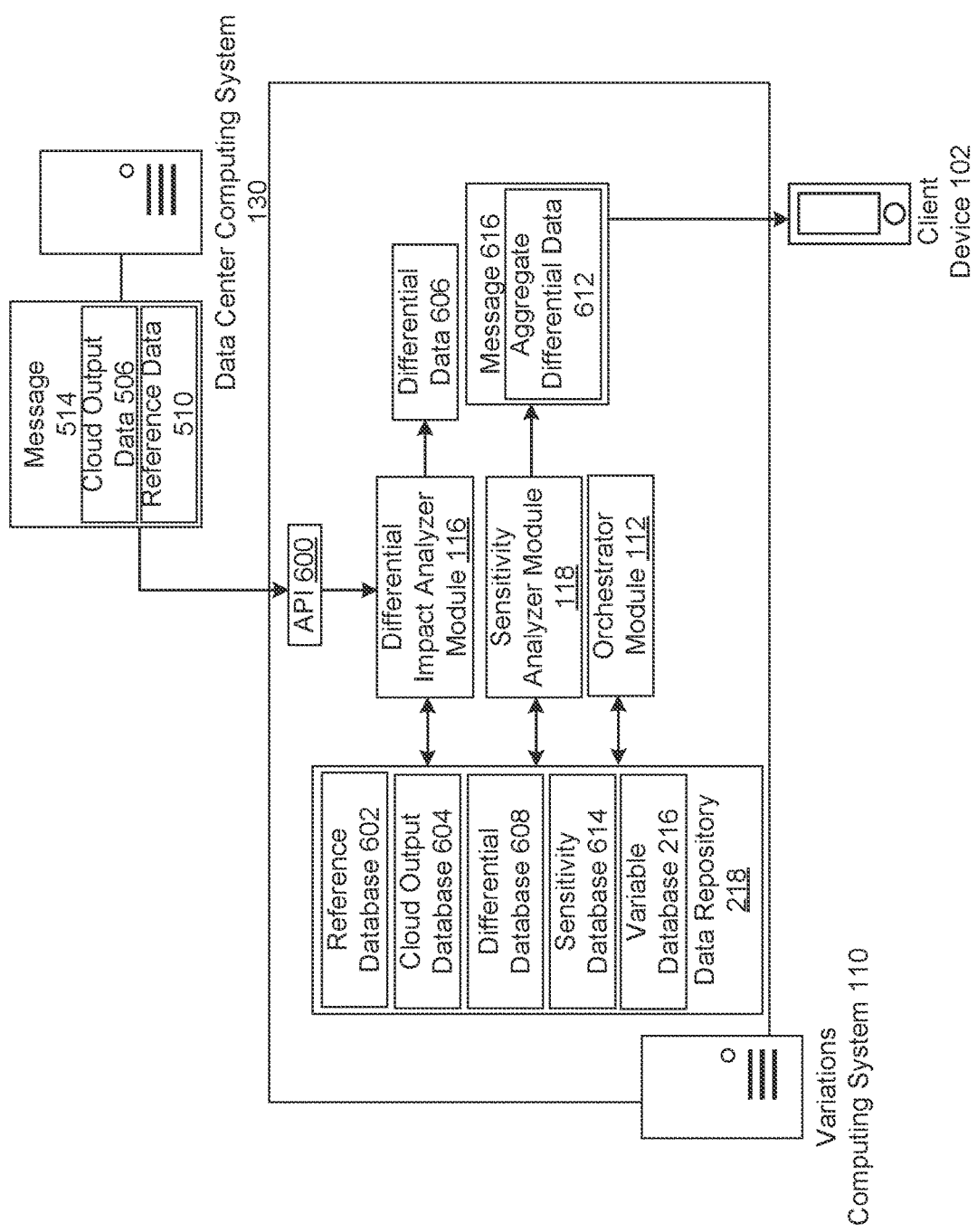

Referring to FIG. 6, API 600, executed by one or more processors of variations computing system 110, may obtain message data including one or more portions of reference data 510 and one or more portions of cloud output data 506. Additionally, API 600 may route message 514 to executed differential impact analyzer module 116. Executed differential impact analyzer module 116 may parse message 514 and extract the one or more portions of reference data 510 and the one or more portions of cloud output data 506. Moreover, executed differential impact analyzer module 116 may store, within one or more tangible non-transitory memories of variations computing system 110, such as reference database 602 and cloud output database 604 of data repository 218, the one or more portions of reference data 510 and the one or more portions of cloud output data 506, respectively.

Further, executed differential impact analyzer module 116 may test and measure the behavior of a cloud service of updated AV bot script 406. In some instances, executed differential impact analyzer module 116 may test and measure the behavior of the cloud service by verifying the logic of the cloud service associated with an updated AV bot script, such as updated AV bot script 406 based in part on cloud output data associated with the updated AV bot script, such as cloud output data 506. Further, executed differential impact analyzer module 116 may verify the logic of the cloud service by determining whether the cloud service is behaving as expected. Referring to FIG. 6, executed differential impact analyzer module 116 may obtain, from cloud output database 604, cloud output data 506. Additionally, executed differential impact analyzer module 116 may obtain, from reference database 602, reference data 510. Moreover, executed differential impact analyzer module 116 may compare reference data 510 with cloud output data 506 and determine whether any differences exist between reference data 510 and cloud output data 506. Executed differential impact analyzer module 116 may generate differential data 606 identifying and indicating whether any differences exist between reference data 510 and cloud output data 506. In examples where executed differential impact analyzer module 116 determines there are one or more differences between reference data 510 and cloud output data 506, executed differential impact analyzer module 116 may generate differential data 606 including data indicating that one or more differences exist between reference data 510 and cloud output data 506 and data characterizing the determined differences. However, in examples where executed differential impact analyzer module 116 determines that reference data 510 and cloud output data 506 match, where executed differential impact analyzer module 116 may generate differential data 606 indicating that the logic of the corresponding cloud service(s) is verified and that reference data 510 and cloud output data 506 match.

In some examples, executed differential impact analyzer module 116 may store within one or more tangible non-transitory memories of variations computing system 110, such as differential database 608 of data repository 202, differential data 606 associated with cloud output data 506 of updated AV bot script 406. In examples where multiple updated AV bot scripts were generated by variations computing system 110 and from a single AV bot script, such as AV bot script 400, data center computing system 130 may execute each of the multiple updated AV bot scripts. In some instances, each of the multiple updated AV bot scripts may have a varying state of a particular variable, as described herein. Additionally, executed differential impact analyzer module 116 may generate differential data for each of the multiple executed updated AV bot scripts based on cloud output data of each of the multiple updated AV bot scripts. In such examples, executed sensitivity analyzer module 118 may identify from differential database 608 differential data of each of the multiple updated AV bot scripts.

In some instances, the differential data of each of the multiple updated AV bot scripts may include an original AV bot script identifier that identifies the AV bot script each of the multiple updated AV bot scripts were derived or updated from. In such instances, executed sensitivity analyzer module 118 may utilize the original AV bot script identifier to identify from differential database 608 differential data of each of the multiple updated AV bot scripts that were derived or updated from the same AV bot script. Additionally, executed sensitivity analyzer module 118 may aggregate the differential data of each of the multiple updated AV bot scripts to generate aggregate differential data, such as aggregate differential data 612. As described herein, the aggregate differential data may include information of a behavior of a particular cloud service with the varying states of a particular input of a particular variable of each of the multiple updated AV bot scripts (e.g., updated AV bot script 406). In instances where the information indicates an unexpected behavior, the aggregate differential data may include information characterizing the unexpected behavior. Moreover, executed sensitivity analyzer module 118 may store, within one or more tangible non-transitory memories of variations computing system 110, such as sensitivity database 614 of data repository 218, aggregate differential data, such as aggregate differential data 612.

In other examples, executed sensitivity analyzer module 118 may perform any of the exemplary processes described herein to cause one or more mobile computing devices, such as client device 102 to present information included in aggregate differential data, such as aggregate differential data 612, or differential data of a particular updated AV bot script, such as updated AV bot script 406. For instance, executed sensitivity analyzer module 118 may obtain aggregate differential data 612 of multiple updated AV bot scripts, including updated AV bot script 406. Additionally, executed sensitivity analyzer module 118 may generate message 616 and include, within one or more portions of message 616, one or more portions of aggregate differential data 612. Moreover, executed sensitivity analyzer module 118 may transmit, over one or more networks, such as communications network 120, message 616 to client device 102. Client device 102 may pare message 616 and obtain aggregate differential data 610 from message 616. Additionally, client device 102 may generate one or more interface elements and provide the one or more interface elements to display unit 109B, based on aggregate differential data 610. Display unit 109B may utilize the one or more interface elements to render for presentation a GUI that presents information of aggregate differential data 610, as described herein.

In another instance, and not illustrated in FIG. 6, executed sensitivity analyzer module 118 may obtain differential data 606 of updated AV bot script 406. Additionally, executed sensitivity analyzer module 118 may generate a message and include, within one or more portions of the message, one or more portions of differential data 606. Moreover, executed sensitivity analyzer module 118 may transmit, over one or more networks, such as communications network 120, the message to client device 102. Client device 102 may parse the message and obtain differential data 606 from the message. Additionally, client device 102 may generate one or more interface elements and provide the one or more interface elements to display unit 109B, based on differential data 606. Display unit 109B may utilize the one or more interface elements to render for presentation a GUI that presents information of differential data 606. As described herein, the information may include information indicating whether the varied input of the particular variable causes an associated cloud service to behave as expected, unexpectedly, and if unexpectedly what the behavior is.

Figure 7:
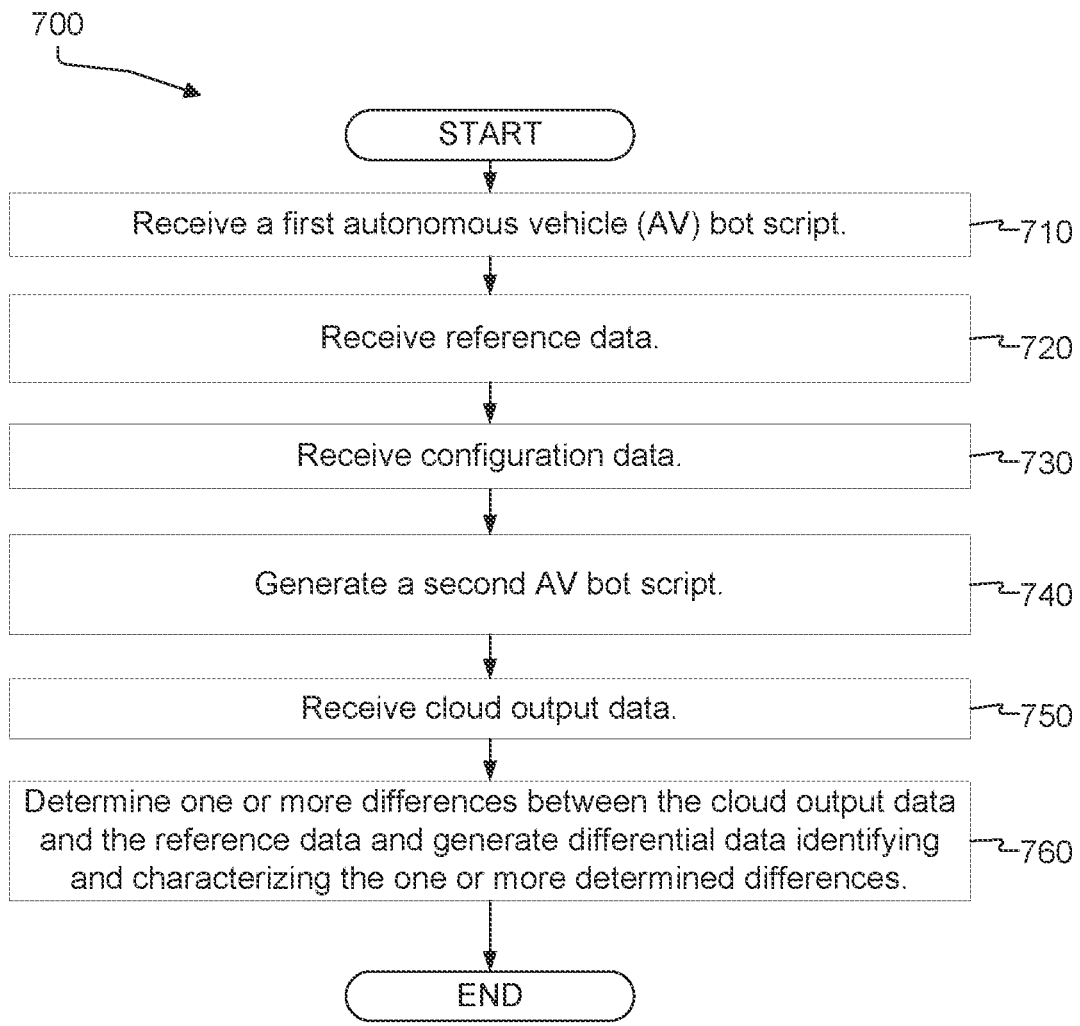
FIG. 7 illustrates a flowchart of an exemplary process for testing and measuring the robustness one or more cloud services of an autonomous vehicle.

FIG. 7 is a flow chart of an exemplary process 700 for testing and measuring the behavior or logic of one or more cloud services associated with an updated AV bot script. In some instances, one or more components of computing environment 100 may perform all or a portion of the steps of exemplary process 700, which include but are not limited to receiving a first autonomous vehicle (AV) bot script, receiving reference data, receiving configuration data, generating a second AV bot script, receiving cloud output data, determining one or more differences between the cloud output data and the reference data, and generating differential data identifying and characterizing the one or more determined differences.

Referring to FIG. 7, variations computing system 110 may receive a first autonomous vehicle (AV) bot script (e.g., in step 710). For example, executed injector module 114 may receive AV bot script 400 from client device 102 over one or more communications networks, such as communications network 120. As described herein, when the first AV bot script is executed by a computing system, such as data center computing system 130, the computing system may generate a first set of AV messages for a first cloud service of a set of cloud services (e.g., ride-hail service).

As described herein, the first AV bot script, such as AV bot script 400, may include a sequence of instructions for a particular AV simulation. In some instances, the AV bot script may include data that identifies one or more cloud services that the simulated AV may be communicating with. Additionally, the sequence of instructions may identify and characterize one or more inputs provided to the simulated AV and one or more AV messages the simulated is to generate and output to the identified one or more cloud services based on the one or more inputs. In some examples, the first AV bot script (e.g., AV bot script 400) may be generated by client device 102 and provided by client device 102 to variations computing system 110, as described herein, over one or more communications networks, such as communications network 120. In other examples, the first AV bot script (e.g., AV bot script 400) may be generated by client device 102 and stored in data center computing system 130. In such examples, variations computing system 110 may obtain the first AV bot script from data center computing system 130, over one or more communications networks, such as communications network 120.

Referring back to FIG. 7, variations computing system 110 may receive reference data (e.g., in step 720). For example, executed differential impact analyzer module 116 may obtain reference data 510 from data center computing system 130 over one or more communications networks, such as communications network 120. As described herein, the reference data, such as reference data 510, may include data identifying and characterizing one or more or a set of cloud messages generated by the one or more cloud services associated with the first AV bot script (e.g., AV bot script 400). Further the one or more or a set of cloud messages may be generated for a simulated AV and may be based on one or more or a set of AV messages of the simulated AV.

As illustrated in FIG. 7, variations computing system 110 may receive configuration data (e.g., in step 730). For example, executed orchestrator module 112 may obtain configuration data 306 from client device 102 over one or more communications networks, such as communications network 120. As described herein, the configuration data, such as configuration data 306, may identify one or more variables and identify and characterize a particular state of each of the one or more variables identified in the configuration data. Additionally, the configuration data may identify a particular cloud service. As described herein, client device 102 may generate the configuration data based on one or more user inputs of a user operating client device 102. In some instances, the configuration data may be in yet-another-markup-language (YAML) format. In other instances, In some examples, the variable may be associated with a component of the simulated AV (e.g., sensors, such as a seat occupancy sensor, a window sensor, an emergency stop trigger/button, a seat belt sensor, a tire sensor, etc.). In such examples, the configuration data may identify the component (e.g., an occupancy sensor). Additionally, the configuration data may indicate a particular state of the corresponding component to, in a corresponding AV message (e.g., a state of the occupancy sensor to include in one or more of the AV messages). In some instances, configuration data may include a value corresponding to a particular state of a component. In such instances, the component may have a range of states or multiple states and each state of the range or multiple states may have a corresponding value. As such, the value may be one of multiple, or a range or set of values. Moreover, the configuration data may include a timing parameter associated with the state of the corresponding moments component. For instance, the timing parameter may indicate a particular time or time interval the simulated component is to be in that particular state. Additionally, data center computing system 130 may perform operations that cause the simulated AV to generate one or more AV messages that include information corresponding to the particular state of the component and generate and/or output the one or more AV messages in accordance with the timing parameter. The one or more AV messages may be transmitted or outputted by the simulated AV after or at the indicated time or after or within the indicated time interval. Further, and in various instances, the configuration data may include a scenario identifier that identifies a scenario to apply the configuration data to.

In other examples, the variable may be associated with one or more modes of a simulated AV (e.g., manual mode, recovery mode, driverless mode, etc.). Additionally, the configuration data may identify the one or more modes. For instance, configuration data may include a value corresponding to each of the one or more modes of the simulated AV. Moreover, the parameter may include a timing parameter associated with each of the one or more modes. For instance, the timing parameter may indicate the simulated AV is to be in a particular mode (e.g., driverless mode) at a particular time or time interval. In such an instance, data center computing system 130 may perform operations that cause the simulated AV to generate one or more AV messages in accordance with the timing parameter. Additionally, the one or more AV messages may indicate the simulated AV is in the indicated mode. The one or more signals may be transmitted or outputted by the simulated AV at the indicated time or within the indicated time interval.

Referring back to FIG. 7, variations computing system 110 may generate a second AV bot script (e.g., in step 740). For example, executed injector module 114 may generate updated AV bot script 406. As described herein, variations computing system 110 may generate the second AV bot script based on the configuration data, such as configuration data 306, and the first AV bot script, such as AV bot script 400.

By way of example, based on the first AV bot script, such as AV bot script 400, executed injector module 114 may identify each input to an AV to be simulated in accordance with AV bot script. Additionally, based on the AV bot script, executed injector module 114 may determine, for each AV messaged identified in the AV bot script, an associated variable (e.g., a component or mode) and a corresponding state (e.g., for a component associated with an occupancy seat sensor the corresponding state may be that the occupancy seat sensor detects a person/object). Moreover, executed injector module 114 may determine or identify each variable (e.g., a component or mode) in the configuration data, such as configuration data 306, and a corresponding state (e.g., for a component associated with an occupancy seat sensor, the corresponding state may be that the occupancy seat sensor does not detect a person/object). Based on the identified variable of each of the one or more AV messages and the identified variables of the configuration data, executed injector module 114 may determine, for each identified variable of the first AV bot script, a matching variable of the configuration data. Further, and as described herein, for each variable of the one or more AV messages that match a variable identified in the configuration data, executed injector module 114 may replace or inject, within the first AV bot script, the state of each matching variable with a corresponding state determined in the configuration data.

Referring back to FIG. 7, variations computing system 110 may receive cloud output data (e.g., in step 750). For example, executed differential impact analyzer module 116 may obtain cloud output data 506 from data center computing system 130 over one or more communications network, such as communications network 120. In some examples, the cloud output data, such as cloud output data 506, may include data identifying and characterizing a second set of cloud messages outputted from the first cloud service and for the simulated AV based on the second set of AV messages.

By way of example, executed injector module 114 may provide updated AV bot script 406 to data center computing system 130, over one or more communications networks, such as communications network 120. Based on the one or more portions of updated AV bot script 406, executed simulator module 142 may execute updated AV bot script 406. Additionally, the simulated AV may generate one or more AV messages 502 in accordance with the updated AV bot script 406. Moreover, the one or more AV messages 502 may include information of one or more variables, such as the state of an occupancy sensor variable, that one or more cloud services may utilize. Further, based on one or more other portions of updated AV bot script 406, executed cloud engine 508 may also determine one or more cloud services that may communicate with the simulated AV of the executed updated AV bot script 406 (e.g., a cloud service associated with ride-hail service). Based on the one or more other portions of updated AV bot script 406, executed cloud engine 508 may execute the identified or determined cloud service. Upon executing the cloud service, executed cloud engine 508 may provide as input to the identified and executed cloud service, the one or more AV messages 502. The identified and executed cloud service may generate cloud output data 506 based on the one or more AV messages 502. As described herein, executed cloud engine 508 may provide cloud output data 506 to variations computing system 110.

Referring back to FIG. 7, variations computing system 110 may determine one or more differences between the cloud output data and the reference data and generate differential data identifying and characterizing the one or more determined differences (e.g., in step 760). For example, executed differential impact analyzer module 116 may determine one or more differences between cloud output data 506 and reference data 510. Further, executed differential impact analyzer module 116 may generate differential data 606 identifying and characterizing the one or more determined differences. As described herein, variations computing system 110 may compare the cloud output data, such as cloud output data 506, and the reference data, such as reference data 510. Additionally, based on the comparison, variations computing system 110 may determine whether any differences exist between the reference data and the cloud output data. Further, variations computing system may generate differential data, such as differential data 606, identifying and indicating whether any differences exist between the reference data and the cloud output data.

In examples where variations computing system 110 determines there are one or more differences between the reference data and the cloud output data, variations computing system 110 may generate differential data including data indicating that one or more differences exist between the reference data and the cloud output data. Additionally, variations computing system 110 may generate and include in the differential data, data characterizing the determined differences. However, in examples where variations computing system 110 determines that the reference data and the cloud output data match, variations computing system 110 may generate differential data indicating that the logic of the corresponding cloud service(s) is verified and that the reference data and cloud output data match.

Figure 8:
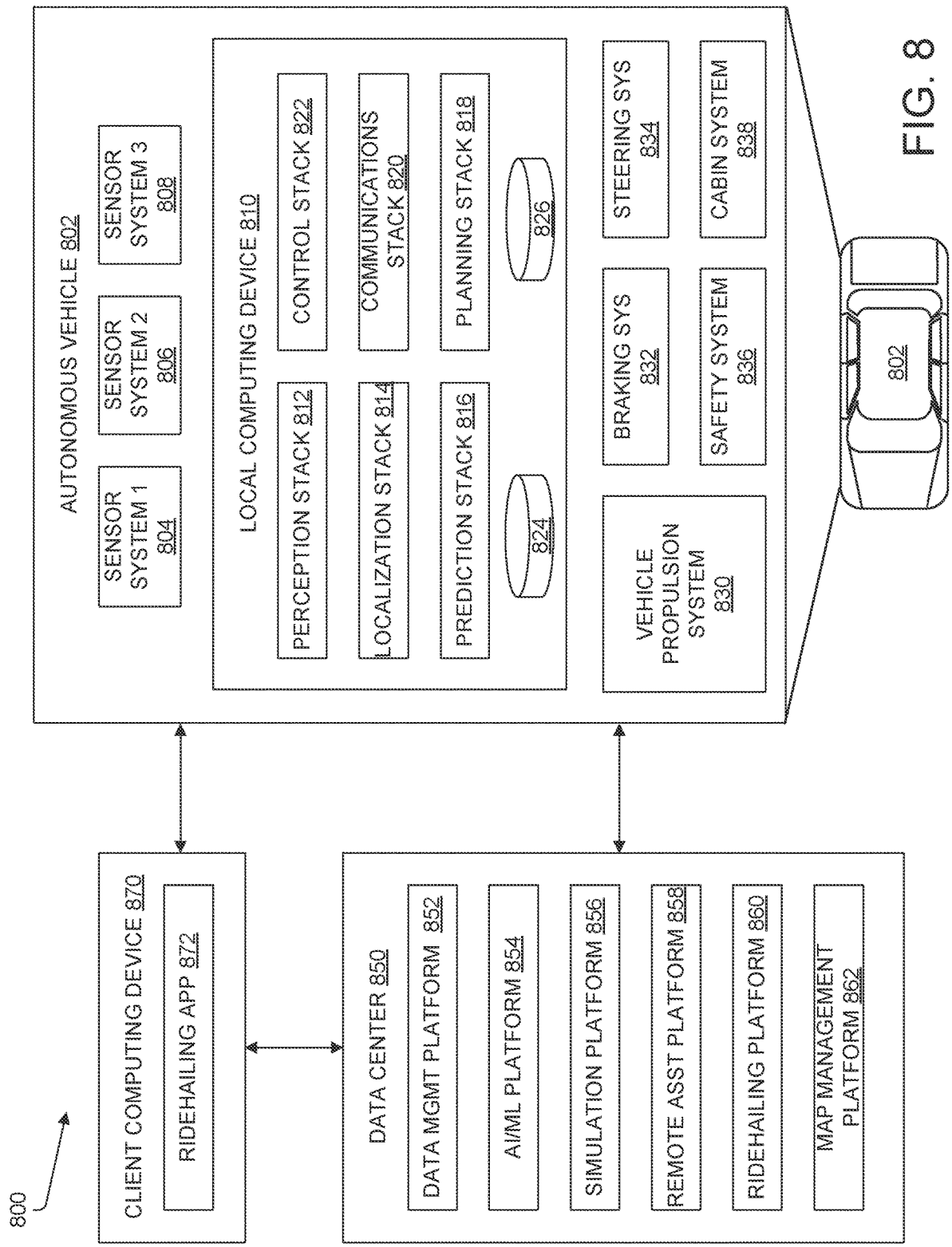
FIG. 8 illustrates an example system environment that can be used to facilitate autonomous vehicle (AV) dispatch and operations, according to some aspects of the disclosed technology.

FIG. 8 is a diagram illustrating an example autonomous vehicle (AV) environment 800, according to some examples of the present disclosure. One of ordinary skill in the art will understand that, for AV environment 800 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 800 includes an AV 802, a data center 850, and a client computing device 870. The AV 802, the data center 850, and the client computing device 870 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 802 can navigate roadways without a human driver based on sensor signals generated by multiple sensor systems 804, 806, and 808. The sensor systems 804-808 can include one or more types of sensors and can be arranged about the AV 802. For instance, the sensor systems 804-808 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 can be a camera system, the sensor system 806 can be a LIDAR system, and the sensor system 808 can be a RADAR system. Other examples may include any other number and type of sensors.

The AV 802 can also include several mechanical systems that can be used to maneuver or operate the AV 802. For instance, the mechanical systems can include a vehicle propulsion system 830, a braking system 832, a steering system 834, a safety system 836, and a cabin system 838, among other systems. The vehicle propulsion system 830 can include an electric motor, an internal combustion engine, or both. The braking system 832 can include an engine brake, brake pads, actuators, and/or any other suitable componentry configured to assist in decelerating the AV 802. The steering system 834 can include suitable componentry configured to control the direction of movement of the AV 802 during navigation. The safety system 836 can include lights and signal indicators, a parking brake, airbags, and so forth. The cabin system 838 can include cabin temperature control systems, in-cabin entertainment systems, and so forth. In some examples, the AV 802 might not include human driver actuators (e.g., steering wheel, handbrake, foot brake pedal, foot accelerator pedal, turn signal lever, window wipers, etc.) for controlling the AV 802. Instead, the cabin system 838 can include one or more client interfaces (e.g., Graphical User Interfaces (GUIs), Voice User Interfaces (VUIs), etc.) for controlling certain aspects of the mechanical systems 830-838.

The AV 802 can include a local computing device 810 that is in communication with the sensor systems 804-808, the mechanical systems 830-838, the data center 850, and the client computing device 870, among other systems. The local computing device 810 can include one or more processors and memory, including instructions that can be executed by the one or more processors. The instructions can make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a localization stack 814, a prediction stack 816, a planning stack 818, a communications stack 820, a control stack 822, an AV operational database 824, and an HD geospatial database 826, among other stacks and systems.

Perception stack 812 can enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the localization stack 814, the HD geospatial database 826, other components of the AV, and other data sources (e.g., the data center 850, the client computing device 870, third party data sources, etc.). The perception stack 812 can detect and classify objects and determine their current locations, speeds, directions, and the like. In addition, the perception stack 812 can determine the free space around the AV 802 (e.g., to maintain a safe distance from other objects, change lanes, park the AV, etc.). The perception stack 812 can identify environmental uncertainties, such as where to look for moving objects, flag areas that may be obscured or blocked from view, and so forth. In some examples, an output of the perception stack 812 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 814 can determine the AV's position and orientation (pose) using different methods from multiple systems (e.g., GPS, IMUs, cameras, LIDAR, RADAR, ultrasonic sensors, the HD geospatial database 826, etc.). For example, in some cases, the AV 802 can compare sensor data captured in real-time by the sensor systems 804-808 to data in the HD geospatial database 826 to determine its precise (e.g., accurate to the order of a few centimeters or less) position and orientation. The AV 802 can focus its search based on sensor data from one or more first sensor systems (e.g., GPS) by matching sensor data from one or more second sensor systems (e.g., LIDAR). If the mapping and localization information from one system is unavailable, the AV 802 can use mapping and localization information from a redundant system and/or from remote data sources.

Prediction stack 816 can receive information from the localization stack 814 and objects identified by the perception stack 812 and predict a future path for the objects. In some examples, the prediction stack 816 can output several likely paths that an object is predicted to take along with a probability associated with each path. For each predicted path, the prediction stack 816 can also output a range of points along the path corresponding to a predicted location of the object along the path at future time intervals along with an expected error value for each of the points that indicates a probabilistic deviation from that point.

Planning stack 818 can determine how to maneuver or operate the AV 802 safely and efficiently in its environment. For example, the planning stack 818 can receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain phases or events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 802 from one point to another and outputs from the perception stack 812, localization stack 814, and prediction stack 816. The planning stack 818 can determine multiple sets of one or more mechanical operations that the AV 802 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 818 can select from multiple backup plans to carry out. For example, while preparing to change lanes to turn right at an intersection, another vehicle may aggressively cut into the destination lane, making the lane change unsafe. The planning stack 818 could have already determined an alternative plan for such an event. Upon its occurrence, it could help direct the AV 802 to go around the block instead of blocking a current lane while waiting for an opening to change lanes.

Control stack 822 can manage the operation of the vehicle propulsion system 830, the braking system 832, the steering system 834, the safety system 836, and the cabin system 838. The control stack 822 can receive sensor signals from the sensor systems 804-808 as well as communicate with other stacks or components of the local computing device 810 or a remote system (e.g., the data center 850) to effectuate operation of the AV 802. For example, the control stack 822 can implement the final path or actions from the multiple paths or actions provided by the planning stack 818. This can involve turning the routes and decisions from the planning stack 818 into commands for the actuators that control the AV's steering, throttle, brake, and drive unit.

Communications stack 820 can transmit and receive signals between the various stacks and other components of the AV 802 and between the AV 802, the data center 850, the client computing device 870, and other remote systems. The communications stack 820 can enable the local computing device 810 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 820 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 826 can store HD maps and related data of the streets upon which the AV 802 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 824 can store raw AV data generated by the sensor systems 804-808, stacks 812-822, and other components of the AV 802 and/or data received by the AV 802 from remote systems (e.g., the data center 850, the client computing device 870, etc.). In some examples, the raw AV data can include HD LIDAR point cloud data, image data, RADAR data, GPS data, and other sensor data that the data center 850 can use for creating or updating AV geospatial data or for creating simulations of situations encountered by AV 802 for future testing or training of various machine learning algorithms that are incorporated in the local computing device 810.

Data center 850 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 850 can include one or more computing devices remote to the local computing device 810 for managing a fleet of AVs and AV-related services. For example, in addition to managing the AV 802, the data center 850 may also support a ride-hailing service (e.g., a ridesharing service), a delivery service, a remote/roadside assistance service, street services (e.g., street mapping, street patrol, street cleaning, street metering, parking reservation, etc.), and the like.

Data center 850 can send and receive various signals to and from the AV 802 and the client computing device 870. These signals can include sensor data captured by the sensor systems 804-808, roadside assistance requests, software updates, ride-hailing/ridesharing pick-up and drop-off instructions, and so forth. In this example, the data center 850 includes a data management platform 852, an Artificial Intelligence/Machine Learning (AI/ML) platform 854, a simulation platform 856, a remote assistance platform 858, and a ride-hailing platform 860, and a map management platform 862, among other systems.

Data management platform 852 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 850 can access data stored by the data management platform 852 to provide their respective services.

The AI/ML platform 854 can provide the infrastructure for training and evaluating machine learning algorithms for operating the AV 802, the simulation platform 856, the remote assistance platform 858, the ride-hailing platform 860, the map management platform 862, and other platforms and systems. Using the AI/ML platform 854, data scientists can prepare data sets from the data management platform 852; select, design, and train machine learning models; evaluate, refine, and deploy the models; maintain, monitor, and retrain the models; and so on.

Simulation platform 856 can enable testing and validation of the algorithms, machine learning models, neural networks, and other development efforts for the AV 802, the remote assistance platform 858, the ride-hailing platform 860, the map management platform 862, and other platforms and systems. Simulation platform 856 can replicate a variety of driving environments and/or reproduce real-world scenarios from data captured by the AV 802, including rendering geospatial information and road infrastructure (e.g., streets, lanes, crosswalks, traffic lights, stop signs, etc.) obtained from a cartography platform (e.g., map management platform 862); modeling the behavior of other vehicles, bicycles, pedestrians, and other dynamic elements; simulating inclement weather conditions, different traffic scenarios; and so on.

Remote assistance platform 858 can generate and transmit instructions regarding the operation of the AV 802. For example, in response to an output of the AI/ML platform 854 or other system of the data center 850, the remote assistance platform 858 can prepare instructions for one or more stacks or other components of the AV 802.

Ride-hailing platform 860 can interact with a customer of a ride-hailing service via a ride-hailing application 872 executing on the client computing device 870. The client computing device 870 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 872. The client computing device 870 can be a customer's mobile computing device or a computing device integrated with the AV 802 (e.g., the local computing device 810). The ride-hailing platform 860 can receive requests to pick up or drop off from the ride-hailing application 872 and dispatch the AV 802 for the trip.

Map management platform 862 can provide a set of tools for the manipulation and management of geographic and spatial (geospatial) and related attribute data. The data management platform 852 can receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data can be processed, and map management platform 862 can render base representations (e.g., tiles (2D), bounding volumes (3D), etc.) of the AV geospatial data to enable users to view, query, label, edit, and otherwise interact with the data. Map management platform 862 can manage workflows and tasks for operating on the AV geospatial data. Map management platform 862 can control access to the AV geospatial data, including granting or limiting access to the AV geospatial data based on user-based, role-based, group-based, task-based, and other attribute-based access control mechanisms. Map management platform 862 can provide version control for the AV geospatial data, such as to track specific changes that (human or machine) map editors have made to the data and to revert changes when necessary. Map management platform 862 can administer release management of the AV geospatial data, including distributing suitable iterations of the data to different users, computing devices, AVs, and other consumers of HD maps. Map management platform 862 can provide analytics regarding the AV geospatial data and related data, such as to generate insights relating to the throughput and quality of mapping tasks.

In some embodiments, the map viewing services of map management platform 862 can be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ride-hailing platform 860 may incorporate the map viewing services into the client application 872 to enable passengers to view the AV 802 in transit en-route to a pick-up or drop-off location, and so on.

While the autonomous vehicle 802, the local computing device 810, and the autonomous vehicle environment 800 are shown to include certain systems and components, one of ordinary skill will appreciate that the autonomous vehicle 802, the local computing device 810, and/or the autonomous vehicle environment 800 can include more or fewer systems and/or components than those shown in FIG. 8. For example, the autonomous vehicle 802 can include other services than those shown in FIG. 8 and the local computing device 810 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 8. An illustrative example of a computing device and hardware components that can be implemented with the local computing device 810 is described below with respect to FIG. 9.

Figure 9:
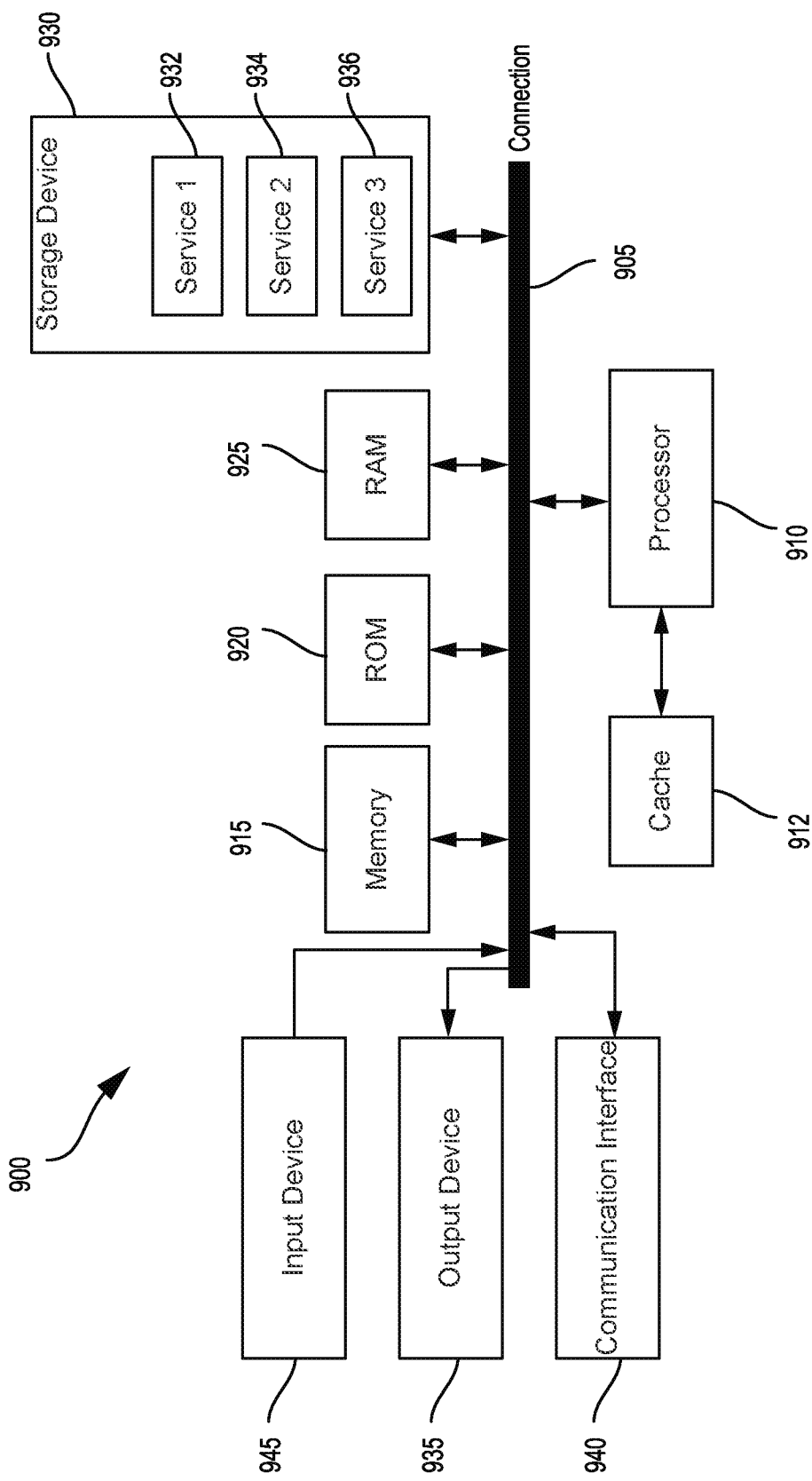
FIG. 9 illustrates an example processor-based system with which some aspects of the subject technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1: A system comprising: a communications unit; a storage unit storing instructions; and at least one processor coupled to the communications unit and the storage unit, the at least one processor being configured to execute the instructions to: receive a first autonomous vehicle (AV) bot script that when executed by a first computing system causes the first computing system to generate a first set of AV messages for a first cloud service of a set of cloud services; receive reference data associated with the first cloud service, the reference data including data identifying and characterizing a first set of cloud messages outputted from the first cloud service and for a simulated AV based on the first set of AV messages; receive configuration data identifying at least a first variable of a set of adjustable variables of a simulated AV, a first value of a set of values associated with the first variable, and the first cloud service; generate a second AV bot script based on the configuration data and the first AV bot script, the second AV bot script, when executed by the first computing system, causes the first computing system to generate a second set of AV messages for the first cloud service; receive cloud output data associated with the first cloud service, the cloud output data including data identifying and characterizing a second set of cloud messages outputted from the first cloud service and for the simulated AV based on the second set of AV messages; and determine one or more differences between the cloud output data and the reference data and generate first differential data identifying and characterizing the one or more determined differences.

Aspect 2: The system of Aspect 1, wherein the at least one processor is further configured to: receive second configuration data identifying at least the first variable of the simulated AV, a second value of the set of values, and the first cloud service; generate a third AV bot script based on the second configuration data and the first bot script, the third AV bot script, when executed by the first computing system, causes the first computing system to generate a third set of AV messages for the first cloud service; receive second cloud output data associated with the first cloud service, the second cloud output data including data identifying and characterizing a third set of cloud messages outputted from the first cloud service and for the simulated AV based on the third set of AV messages; determine one or more differences between the second cloud output data and the reference data and generate second differential data identifying and characterizing the one or more determined differences; generate aggregate differential data based on the first differential data and the second differential data; and obtain mitigation data based on the aggregate differential data, the mitigation data identifying one or more parameters that reduce an occurrence of the one or more differences determined from the first differential data and one or more differences determined from the second differential data.

Aspect 3: The apparatus of Aspects 1 or 2, wherein the first variable is associated with a sensor and each of the set of values is associated with a particular state of the sensor.

Aspect 4: The apparatus of Aspects 1 to 3, wherein generating the second AV bot script includes injecting one or more portions of the configuration data into the first bot script.

Aspect 5: The apparatus of Aspects 1 to 4, wherein the at least one processor is further configured to: obtain mitigation data based on the first differential data.

Aspect 6: The apparatus of Aspect 5, wherein the at least one processor is further configured to: transmit the first differential data the first computing system, the first computing system being configured to generate the mitigation data based on the first differential data and provide the mitigation data to the system.

Aspect 7: The apparatus of Aspect 5, wherein the first differential data identifies and characterizes one or more differences associated with an occupancy sensor state and the mitigation data identifies and characterizes one or more parameters associated with a low pass filter in relation to an occupancy sensor corresponding to the occupancy sensor state.

Aspect 8: The apparatus of Aspect 1 to 7, wherein the first variable is associated with a state of a component of the simulated AV or a mode of the simulated AV.

Aspect 9: A computer-implemented method comprising: receiving a first autonomous vehicle (AV) bot script that when executed by a first computing system causes the first computing system to generate a first set of AV messages for a first cloud service of a set of cloud services; receiving reference data associated with the first cloud service, the reference data including data identifying and characterizing a first set of cloud messages outputted from the first cloud service and for a simulated AV based on the first set of AV messages; receiving configuration data identifying at least a first variable of a set of adjustable variables of a simulated AV, a first value of a set of values associated with the first variable, and the first cloud service; generating a second AV bot script based on the configuration data and the first AV bot script, the second AV bot script, when executed by the first computing system, causes the first computing system to generate a second set of AV messages for the first cloud service; receiving cloud output data associated with the first cloud service, the cloud output data including data identifying and characterizing a second set of cloud messages outputted from the first cloud service and for the simulated AV based on the second set of AV messages; and determining one or more differences between the cloud output data and the reference data and generate first differential data identifying and characterizing the one or more determined differences.

Aspect 10: The computer-implemented method of Aspect 9, further comprising: receiving second configuration data identifying at least the first variable of the simulated AV, a second value of the set of values, and the first cloud service; generating a third AV bot script based on the second configuration data and the first bot script, the third AV bot script, when executed by the first computing system, causes the first computing system to generate a third set of AV messages for the first cloud service; receiving second cloud output data associated with the first cloud service, the second cloud output data including data identifying and characterizing a third set of cloud messages outputted from the first cloud service and for the simulated AV based on the third set of AV messages; determining one or more differences between the second cloud output data and the reference data and generate second differential data identifying and characterizing the one or more determined differences; generating aggregate differential data based on the first differential data and the second differential data; and obtaining mitigation data based on the aggregate differential data, the mitigation data identifying one or more parameters that reduce an occurrence of the one or more differences determined from the first differential data and one or more differences determined from the second differential data.

Aspect 11: The computer-implemented method of Aspect 9 or 10, wherein the first variable is associated with a sensor and each of the set of values is associated with a particular state of the sensor.

Aspect 12: The computer-implemented method of Aspect 9 to 11, wherein generating the second AV bot script includes injecting one or more portions of the configuration data into the first bot script.

Aspect 13: The computer-implemented method of Aspect 9 to 12, further comprising: obtaining mitigation data based on the first differential data.

Aspect 14: The computer-implemented method of Aspect 13, further comprising: transmitting the first differential data the first computing system, the first computing system being configured to generate the mitigation data based on the first differential data.

Aspect 15: The computer-implemented method of Aspect 13, wherein the first differential data identifies and characterizes one or more differences associated with an occupancy sensor state and the mitigation data identifies and characterizes one or more parameters associated with a low pass filter in relation to an occupancy sensor corresponding to the occupancy sensor state.

Aspect 16: The computer-implemented method of Aspect 9 to 16, wherein the first variable is associated with a state of a component of the simulated AV or a mode of the simulated AV.

Aspect 17: A tangible, non-transitory computer readable medium storing instructions that, when executed by at least one processor, cause the at least one processor to perform operations comprising: receiving a first autonomous vehicle (AV) bot script that when executed by a first computing system causes the first computing system to generate a first set of AV messages for a first cloud service of a set of cloud services; receiving reference data associated with the first cloud service, the reference data including data identifying and characterizing a first set of cloud messages outputted from the first cloud service and for a simulated AV based on the first set of AV messages; receiving configuration data identifying at least a first variable of a set of adjustable variables of a simulated AV, a first value of a set of values associated with the first variable, and the first cloud service; generating a second AV bot script based on the configuration data and the first AV bot script, the second AV bot script, when executed by the first computing system, causes the first computing system to generate a second set of AV messages for the first cloud service; receiving cloud output data associated with the first cloud service, the cloud output data including data identifying and characterizing a second set of cloud messages outputted from the first cloud service and for the simulated AV based on the second set of AV messages; and determining one or more differences between the cloud output data and the reference data and generate first differential data identifying and characterizing the one or more determined differences.

Aspect 18: The tangible, non-transitory computer readable medium of Aspect 15, wherein the at least one processor performs operations further comprising: receiving second configuration data identifying at least the first variable of the simulated AV, a second value of the set of values, and the first cloud service; generating a third AV bot script based on the second configuration data and the first bot script, the third AV bot script, when executed by the first computing system, causes the first computing system to generate a third set of AV messages for the first cloud service; receiving second cloud output data associated with the first cloud service, the second cloud output data including data identifying and characterizing a third set of cloud messages outputted from the first cloud service and for the simulated AV based on the third set of AV messages; determining one or more differences between the second cloud output data and the reference data and generate second differential data identifying and characterizing the one or more determined differences; generating aggregate differential data based on the first differential data and the second differential data; and obtaining mitigation data based on the aggregate differential data, the mitigation data identifying one or more parameters that reduce an occurrence of the one or more differences determined from the first differential data and one or more differences determined from the second differential data Aspect 19: The tangible, non-transitory computer readable medium of Aspect 17 or 18, wherein the first variable is associated with a sensor and each of the set of values is associated with a particular state of the sensor.

Aspect 20: The tangible, non-transitory computer readable medium of Aspect 17 to 19 wherein generating the second AV bot script includes injecting one or more portions of the configuration data into the first bot script.

Aspect 21: The tangible, non-transitory computer readable medium of Aspect 17 to 20, wherein the at least one processor performs operations further comprising: obtaining mitigation data based on the first differential data.

Aspect 22: The tangible, non-transitory computer readable medium of Aspect 21, wherein the at least one processor performs operations further comprising: transmitting the first differential data the first computing system, the first computing system being configured to generate the mitigation data based on the first differential data.

Aspect 23: The tangible, non-transitory computer readable medium of Aspect 21, wherein the first differential data identifies and characterizes one or more differences associated with an occupancy sensor state and the mitigation data identifies and characterizes one or more parameters associated with a low pass filter in relation to an occupancy sensor corresponding to the occupancy sensor state.

Aspect 24: The tangible, non-transitory computer readable medium of Aspect 17 to 23, wherein the first variable is associated with a state of a component of the simulated AV or a mode of the simulated AV.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:
a communications unit;
a storage unit storing instructions; and
at least one processor coupled to the communications unit and the storage unit, the at least one processor being configured to execute the instructions to:
receive a first autonomous vehicle (AV) bot script that when executed by a first computing system causes the first computing system to generate a first set of AV messages for a first cloud service of a set of cloud services;
receive reference data associated with the first cloud service, the reference data including data identifying and characterizing a first set of cloud messages outputted from the first cloud service and for a simulated AV based on the first set of AV messages;
receive configuration data identifying at least a first variable of a set of adjustable variables of a simulated AV, a first value of a set of values associated with the first variable, and the first cloud service;
generate a second AV bot script based on the configuration data and the first AV bot script, the second AV bot script, when executed by the first computing system, causes the first computing system to generate a second set of AV messages for the first cloud service;
receive cloud output data associated with the first cloud service, the cloud output data including data identifying and characterizing a second set of cloud messages outputted from the first cloud service and for the simulated AV based on the second set of AV messages; and
determine one or more differences between the cloud output data and the reference data and generate first differential data identifying and characterizing the one or more determined differences.

2. The system of claim 1, wherein the at least one processor is further configured to:
receive second configuration data identifying at least the first variable of the simulated AV, a second value of the set of values, and the first cloud service;
generate a third AV bot script based on the second configuration data and the first AV bot script, the third AV bot script, when executed by the first computing system, causes the first computing system to generate a third set of AV messages for the first cloud service;
receive second cloud output data associated with the first cloud service, the second cloud output data including data identifying and characterizing a third set of cloud messages outputted from the first cloud service and for the simulated AV based on the third set of AV messages;

determine one or more differences between the second cloud output data and the reference data and generate second differential data identifying and characterizing the one or more determined differences;
generate aggregate differential data based on the first differential data and the second differential data; and
obtain mitigation data based on the aggregate differential data, the mitigation data identifying one or more parameters that reduce an occurrence of the one or more differences determined from the first differential data and one or more differences determined from the second differential data.

3. The system of claim 2, wherein the first variable is associated with a sensor and each of the set of values is associated with a particular state of the sensor.

4. The system of claim 1, wherein generating the second AV bot script includes injecting one or more portions of the configuration data into the first AV bot script.

5. The system of claim 1, wherein the at least one processor is further configured to:
obtain mitigation data based on the first differential data.

6. The system of claim 5, wherein the at least one processor is further configured to:
transmit the first differential data to the first computing system, the first computing system being configured to generate the mitigation data based on the first differential data and provide the mitigation data to the system.

7. The system of claim 5, wherein the first differential data identifies and characterizes one or more differences associated with an occupancy sensor state and the mitigation data identifies and characterizes one or more parameters associated with a low pass filter in relation to an occupancy sensor corresponding to the occupancy sensor state.

8. The system of claim 1, wherein the first variable is associated with a state of a component of the simulated AV or a mode of the simulated AV.

9. A computer-implemented method comprising:
receiving a first autonomous vehicle (AV) bot script that when executed by a first computing system causes the first computing system to generate a first set of AV messages for a first cloud service of a set of cloud services;
receiving reference data associated with the first cloud service, the reference data including data identifying and characterizing a first set of cloud messages outputted from the first cloud service and for a simulated AV based on the first set of AV messages;
receiving configuration data identifying at least a first variable of a set of adjustable variables of a simulated AV, a first value of a set of values associated with the first variable, and the first cloud service;
generating a second AV bot script based on the configuration data and the first AV bot script, the second AV bot script, when executed by the first computing system, causes the first computing system to generate a second set of AV messages for the first cloud service;
receiving cloud output data associated with the first cloud service, the cloud output data including data identifying and characterizing a second set of cloud messages outputted from the first cloud service and for the simulated AV based on the second set of AV messages; and
determining one or more differences between the cloud output data and the reference data and generate first differential data identifying and characterizing the one or more determined differences.

10. The computer-implemented method of claim 9, further comprising:
receiving second configuration data identifying at least the first variable of the simulated AV, a second value of the set of values, and the first cloud service;
generating a third AV bot script based on the second configuration data and the first AV bot script, the third AV bot script, when executed by the first computing system, causes the first computing system to generate a third set of AV messages for the first cloud service;
receiving second cloud output data associated with the first cloud service, the second cloud output data including data identifying and characterizing a third set of cloud messages outputted from the first cloud service and for the simulated AV based on the third set of AV messages;
determining one or more differences between the second cloud output data and the reference data and generate second differential data identifying and characterizing the one or more determined differences;
generating aggregate differential data based on the first differential data and the second differential data; and
obtaining mitigation data based on the aggregate differential data, the mitigation data identifying one or more parameters that reduce an occurrence of the one or more differences determined from the first differential data and one or more differences determined from the second differential data.

11. The computer-implemented method of claim 10, wherein the first variable is associated with a sensor and each of the set of values is associated with a particular state of the sensor.

12. The computer-implemented method of claim 9, wherein generating the second AV bot script includes injecting one or more portions of the configuration data into the first AV bot script.

13. The computer-implemented method of claim 9, further comprising:
obtaining mitigation data based on the first differential data.

14. The computer-implemented method of claim 13, further comprising:
transmitting the first differential data to the first computing system, the first computing system being configured to generate the mitigation data based on the first differential data.

15. The computer-implemented method of claim 13, wherein the first differential data identifies and characterizes one or more differences associated with an occupancy sensor state and the mitigation data identifies and characterizes one or more parameters associated with a low pass filter in relation to an occupancy sensor corresponding to the occupancy sensor state.

16. The computer-implemented method of claim 9, wherein the first variable is associated with a state of a component of the simulated AV or a mode of the simulated AV.

17. A tangible, non-transitory computer readable medium storing instructions that, when executed by at least one processor, cause the at least one processor to perform operations comprising:
receiving a first autonomous vehicle (AV) bot script that when executed by a first computing system causes the first computing system to generate a first set of AV messages for a first cloud service of a set of cloud services;

receiving reference data associated with the first cloud service, the reference data including data identifying and characterizing a first set of cloud messages outputted from the first cloud service and for a simulated AV based on the first set of AV messages;

receiving configuration data identifying at least a first variable of a set of adjustable variables of a simulated AV, a first value of a set of values associated with the first variable, and the first cloud service;

generating a second AV bot script based on the configuration data and the first AV bot script, the second AV bot script, when executed by the first computing system, causes the first computing system to generate a second set of AV messages for the first cloud service;

receiving cloud output data associated with the first cloud service, the cloud output data including data identifying and characterizing a second set of cloud messages outputted from the first cloud service and for the simulated AV based on the second set of AV messages; and determining one or more differences between the cloud output data and the reference data and generate first differential data identifying and characterizing the one or more determined differences.

18. The tangible, non-transitory computer readable medium of claim 17, wherein the at least one processor performs operations further comprising:

receiving second configuration data identifying at least the first variable of the simulated AV, a second value of the set of values, and the first cloud service;

generating a third AV bot script based on the second configuration data and the first AV bot script, the third AV bot script, when executed by the first computing system, causes the first computing system to generate a third set of AV messages for the first cloud service;

receiving second cloud output data associated with the first cloud service, the second cloud output data including data identifying and characterizing a third set of cloud messages outputted from the first cloud service and for the simulated AV based on the third set of AV messages;

determining one or more differences between the second cloud output data and the reference data and generate second differential data identifying and characterizing the one or more determined differences;

generating aggregate differential data based on the first differential data and the second differential data; and obtaining mitigation data based on the aggregate differential data, the mitigation data identifying one or more parameters that reduce an occurrence of the one or more differences determined from the first differential data and one or more differences determined from the second differential data.

19. The tangible, non-transitory computer readable medium of claim 17, wherein generating the second AV bot script includes injecting one or more portions of the configuration data into the first AV bot script.

20. The tangible, non-transitory computer readable medium of claim 17, wherein the at least one processor performs operations further comprising:

obtaining mitigation data based on the first differential data.

* * * * *